US012206483B2

(12) United States Patent
Guo et al.

(10) Patent No.: US 12,206,483 B2
(45) Date of Patent: Jan. 21, 2025

(54) UNICAST COORDINATION FOR SPATIAL DIVISION MULTIPLEXING COMMUNICATIONS

(71) Applicant: QUALCOMM Incorporated, San Diego, CA (US)

(72) Inventors: Hui Guo, Beijing (CN); Kapil Gulati, Belle Mead, NJ (US); Shuanshuan Wu, San Diego, CA (US); Junyi Li, Fairless Hills, PA (US); Sourjya Dutta, San Diego, CA (US); Gabi Sarkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/043,557

(22) PCT Filed: Oct. 7, 2020

(86) PCT No.: PCT/CN2020/119833
§ 371 (c)(1),
(2) Date: Feb. 28, 2023

(87) PCT Pub. No.: WO2022/073158
PCT Pub. Date: Apr. 14, 2022

(65) Prior Publication Data
US 2024/0030992 A1 Jan. 25, 2024

(51) Int. Cl.
*H04B 7/06* (2006.01)
*H04B 7/0456* (2017.01)
*H04W 76/14* (2018.01)

(52) U.S. Cl.
CPC ......... *H04B 7/0695* (2013.01); *H04B 7/0456* (2013.01); *H04W 76/14* (2018.02)

(58) Field of Classification Search
CPC ... H04B 7/0695; H04B 7/0456; H04W 76/14; H04W 4/40
See application file for complete search history.

(56) References Cited

U.S. PATENT DOCUMENTS

2020/0236654 A1    7/2020  Hong et al.
2020/0374933 A1*  11/2020  Lou .................... H04W 74/006
(Continued)

FOREIGN PATENT DOCUMENTS

CA         2442439 C  *  7/2007  ............... H04L 1/08
CA         3098633 A1 * 11/2019  ........... H04L 5/0048
(Continued)

OTHER PUBLICATIONS

ERICSSON: "Feasibility and Benefits of Mode 2 Enhancements for Inter-UE Coordination", 3GPP TSG-RAN WG1 Meeting #102-e, R1-2006445, 3rd Generation Partnership Project (3GPP), Mobile Competence Centre, 650, Route Des Lucioles, F-06921 Sophia-Antipolis Cedex, France, vol. RAN WG1, No. e-Meeting; Aug. 17, 2020-Aug. 28, 2020, Aug. 7, 2020, XP052347818, 7 Pages, Sections 2.1-4.2, section 2, p. 1-p. 2, section 3.1, p. 3, section 3.2, p. 3-p. 4, section 4.2, p. 6-p. 7, figure 3.
(Continued)

*Primary Examiner* — Jean B Corrielus
(74) *Attorney, Agent, or Firm* — Holland & Hart LLP

(57) ABSTRACT

Methods, systems, and devices for wireless communications are described. A first user equipment (UE) may establish multiple unicast connections with multiple other UEs. The first UE may then determine individual sets of transmission parameters for each of the multiple other UEs, where the individual sets of transmission parameters may enable the first UE to receive transmissions from the multiple other UEs on a same set of time and frequency resources via a spatial division multiplexing scheme. For example, each of the individual sets of transmission parameters may include
(Continued)

a transmission schedule adjustment, a transmit power, a transmit time, an indication of the time and frequency resources, or a combination thereof. The first UE may then transmit each of the individual sets of transmission parameters to a respective UE of the multiple other UEs.

35 Claims, 19 Drawing Sheets

(56) References Cited

U.S. PATENT DOCUMENTS

2023/0232415 A1* 7/2023 Kim .................... H04W 72/232
                                                                370/329
2023/0362934 A1* 11/2023 Grieco ................. H04W 76/11

FOREIGN PATENT DOCUMENTS

| CA | 3097216 A1 * | 7/2020 | ........... H04L 1/1812 |
| EP | 3697111 A1 | 8/2020 | |
| WO | WO-2018052749 | 3/2018 | |

OTHER PUBLICATIONS

Huawei, et al., "Sidelink Physical Layer Procedures for NR V2X", 3GPP TSG RAN WG1 Meeting #95, R1-1812205, 3rd Generation Partnership Project (3GPP), Mobile Competence Centre, 650, Route Des Lucioles, F-06921 Sophia-Antipolis Cedex, France, vol. RAN WG1. No. Spokane. USA, Nov. 12, 2018-Nov. 16, 2018, Nov. 3, 2018, XP051478361, 12 pages, Sections 1-8, section 1, p. 1, section 7, p. 9-p. 10.
OPPO: "Discussion on Sidelink Unicast and Groupcast for NR-V2X", 3GPP TSG-RAN WG2 Meeting #104, R2-1816339, 3rd Generation Partnership Project (3GPP), Mobile Competence Centre, 650, Route Des Lucioles, F-06921 Sophia-Antipolis Cedex, France, vol. RAN WG2, No. Spokane, US, Nov. 12, 2018-Nov. 16, 2018, Nov. 12, 2018, XP051555930, 5 Pages, section 2.2.1, p. 2-p. 3, figure 2.
Supplementary European Search Report—EP20956473—Search Authority—The Hague—Apr. 24, 2024.
FUJITSU: "Considerations on Inter-UE Coordination for Mode 2 Enhancements", 3GPP TSG RAN WG1 #102-e, R1-2005546, 3rd Generation Partnership Project (3GPP), Mobile Competence Centre, 650, Route Des Lucioles, F-06921 Sophia-Antipolis Cedex, France, e-Meeting, Aug. 17, 2020-Aug. 28, 2020, Aug. 7, 2020, XP051914984, pp. 1-11.
International Search Report and Written Opinion—PCT/CN2020/119833—ISA/EPO—Jul. 12, 2021.
LG Electronics: "Summary of Email Discussion on Rel-17 Sidelink Enhancement", 3GPP TSG RAN #86, 3GPP Draft, RP-192745, 3rd Generation Partnership Project (3GPP), Mobile Competence Centre, 650, Route Des Lucioles, F-06921 Sophia-Antipolis Cedex, France, vol. TSG RAN, No. Sitges, ES, Dec. 9, 2019-Dec. 12, 2019, Dec. 2, 2019 (Dec. 2, 2019), 27 Pages, XP051834348, abstract p. 11-14, the whole document.

* cited by examiner

UNICAST COORDINATION FOR SPATIAL DIVISION MULTIPLEXING COMMUNICATIONS

CROSS REFERENCE

The present application is a 371 national stage filing of International PCT Application No. PCT/CN2020/119833 by GUO et al. entitled "UNICAST COORDINATION FOR SPATIAL DIVISION MULTIPLEXING COMMUNICATIONS," filed Oct. 7, 2020, which is assigned to the assignee hereof, and which is expressly incorporated by reference in its entirety herein.

FIELD OF TECHNOLOGY

The following relates to wireless communications, including unicast coordination for spatial division multiplexing (SDM) communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). Additionally, a first UE may communicate with multiple other UEs via sidelink communications on one or more unicast links. However, as the number of UEs increases with which the first UE is in communications, a strain may be placed on the resources available for the sidelink communications. Efficient techniques are desired for enabling sidelink communications between a UE and multiple other UEs on respective unicast links.

SUMMARY

The described techniques relate to improved methods, systems, devices, and apparatuses that support unicast coordination for spatial division multiplexing (SDM) communications. Generally, the described techniques provide for a first user equipment (UE) (e.g., a receiving UE) to establish multiple unicast connections (e.g., links) with multiple other UEs (e.g., transmitting UEs), where a first set of the other multiple UEs communicates with a first transmission reception point (TRP) of the first UE and a second set of the other multiple UEs communicates with a second TRP of the first UE. Accordingly, the first UE may determine individual sets of transmission parameters for each of the multiple other UEs, where the individual sets of transmission parameters may enable the first UE to receive transmissions from the multiple other UEs on a same set of time and frequency resources via an SDM scheme. For example, each of the individual sets of transmission parameters may include a transmission schedule adjustment, a transmit power, a transmit time, an indication of the time and frequency resources, or a combination thereof. The first UE may then transmit each of the individual sets of transmission parameters to a respective UE of the multiple other UEs. In some implementations, the first UE may transmit each individual set of transmission parameters to the respective UE via a sidelink control information (SCI) message (e.g., a second stage SCI message).

In some implementations, the first UE may transmit a control demodulation reference signal (DMRS) cyclic shift to each of the multiple other UEs to further enable the first UE to receive the transmission from the multiple other UEs via the SDM scheme. Additionally or alternatively, the first UE may transmit an indication of a channel measurement resource (CMR), an interference measurement resource (IMR), or both to enable the first UE to estimate a channel measurement with each of the other multiple UEs and also further enable the first UE to receive the transmission from the multiple other UEs via the SDM scheme. The first UE may transmit the control DMRS cyclic shift, the indication of the CMR, the indication of the IMR, or a combination thereof via an SCI message. Additionally, in some implementations, based on the different TRPs with which the first UE uses to communicate with the multiple other UEs, the first UE may determine the individual sets of parameters per TRP. As such, the first UE may use a same set of transmission parameters for communications with a UE via the first TRP as for communications with a different UE via the second TRP.

A method for wireless communications at a receiving UE is described. The method may include establishing a plurality of unicast connections with a plurality of transmitting UEs, the plurality of transmitting UEs including one or more first transmitting UEs connected to a first TRP of the receiving UE via respective unicast connections of the plurality of unicast connections and one or more second transmitting UEs connected to a second TRP of the receiving UE via respective unicast connections of the plurality of unicast connections, determining a plurality of sets of transmission parameters for the plurality of transmitting UEs, the plurality of sets of transmission parameters enabling the receiving UE to receive transmissions from the plurality of transmitting UEs on a same set of time and frequency resources via an SDM scheme, and transmitting each set of transmission parameters from the plurality of sets of transmission parameters to respective transmitting UEs of the plurality of transmitting UEs.

An apparatus for wireless communications at a receiving UE is described. The apparatus may include a processor, memory in electronic communication with the processor, and instructions stored in the memory. The instructions may be executable by the processor to cause the apparatus to establish a plurality of unicast connections with a plurality of transmitting UEs, the plurality of transmitting UEs including one or more first transmitting UEs connected to a first TRP of the receiving UE via respective unicast connections of the plurality of unicast connections and one or more second transmitting UEs connected to a second TRP of the receiving UE via respective unicast connections of the plurality of unicast connections, determine a plurality of sets of transmission parameters for the plurality of transmitting UEs, the plurality of sets of transmission parameters enabling the receiving UE to receive transmissions from the plurality of transmitting UEs on a same set of time and frequency resources via an SDM scheme, and transmit each set of transmission parameters from the plurality of sets of transmission parameters to respective transmitting UEs of the plurality of transmitting UEs.

Another apparatus for wireless communications at a receiving UE is described. The apparatus may include means for establishing a plurality of unicast connections with a plurality of transmitting UEs, the plurality of transmitting UEs including one or more first transmitting UEs connected to a first TRP of the receiving UE via respective unicast connections of the plurality of unicast connections and one or more second transmitting UEs connected to a second TRP of the receiving UE via respective unicast connections of the plurality of unicast connections, means for determining a plurality of sets of transmission parameters for the plurality of transmitting UEs, the plurality of sets of transmission parameters enabling the receiving UE to receive transmissions from the plurality of transmitting UEs on a same set of time and frequency resources via an SDM scheme, and means for transmitting each set of transmission parameters from the plurality of sets of transmission parameters to respective transmitting UEs of the plurality of transmitting UEs.

A non-transitory computer-readable medium storing code for wireless communications at a receiving UE is described. The code may include instructions executable by a processor to establish a plurality of unicast connections with a plurality of transmitting UEs, the plurality of transmitting UEs including one or more first transmitting UEs connected to a first TRP of the receiving UE via respective unicast connections of the plurality of unicast connections and one or more second transmitting UEs connected to a second TRP of the receiving UE via respective unicast connections of the plurality of unicast connections, determine a plurality of sets of transmission parameters for the plurality of transmitting UEs, the plurality of sets of transmission parameters enabling the receiving UE to receive transmissions from the plurality of transmitting UEs on a same set of time and frequency resources via an SDM scheme, and transmit each set of transmission parameters from the plurality of sets of transmission parameters to respective transmitting UEs of the plurality of transmitting UEs.

In some examples of the method, apparatuses, and non-transitory computer-readable medium described herein, transmitting each set of transmission parameters via an SCI message to the respective transmitting UEs.

In some examples of the method, apparatuses, and non-transitory computer-readable medium described herein, each set of transmission parameters may be indicated via a resource bit map in the SCI message.

In some examples of the method, apparatuses, and non-transitory computer-readable medium described herein, the SCI message may include a second stage SCI message.

Some examples of the method, apparatuses, and non-transitory computer-readable medium described herein may further include operations, features, means, or instructions for transmitting, to the respective transmitting UEs, an indication for a control DMRS cyclic shift for each transmitting UE to use when transmitting communications to the receiving UE, where the control DMRS cyclic shift further enables the receiving UE to receive the transmissions from the plurality of transmitting UEs on the same set of time and frequency resources via the SDM scheme.

In some examples of the method, apparatuses, and non-transitory computer-readable medium described herein, transmitting the indication for the control DMRS cyclic shift to the respective transmitting UEs via an SCI message.

In some examples of the method, apparatuses, and non-transitory computer-readable medium described herein, the SCI message includes a second stage SCI message for UE coordination.

Some examples of the method, apparatuses, and non-transitory computer-readable medium described herein may further include operations, features, means, or instructions for transmitting, to the respective transmitting UEs, an indication of a CMR and an IMR and estimating a channel measurement and an interference measurement per TRP for transmissions from the plurality of transmitting UEs on the same set of time and frequency resources based on the indication of the CMR and the IMR, where the transmissions from the plurality of transmitting UEs may be received based on the estimating.

In some examples of the method, apparatuses, and non-transitory computer-readable medium described herein, transmitting the indication of the CMR and the IMR to each transmitting UE via an SCI message.

In some examples of the method, apparatuses, and non-transitory computer-readable medium described herein, the SCI message includes a second stage SCI message for UE coordination.

Some examples of the method, apparatuses, and non-transitory computer-readable medium described herein may further include operations, features, means, or instructions for receiving a zero power resource from one or more transmitting UEs of the plurality of transmitting UEs for the CMR, the IMR, or both, where the estimating the interference measurement may be based on a measurement of the zero power resource.

Some examples of the method, apparatuses, and non-transitory computer-readable medium described herein may further include operations, features, means, or instructions for determining to transmit the indication of the CMR and the IMR based on a trigger.

In some examples of the method, apparatuses, and non-transitory computer-readable medium described herein, the trigger includes a resource reservation information message decoded based on the SDM scheme, a channel busy ratio (CBR) measurement, receiving an indication to trigger the CMR and the IMR from one or more transmitting UEs from the plurality of transmitting UEs, or a combination thereof.

In some examples of the method, apparatuses, and non-transitory computer-readable medium described herein, the CMR and the IMR may be part of a channel state information (CSI) reference signal (RS) configuration.

In some examples of the method, apparatuses, and non-transitory computer-readable medium described herein, the CMR and the IMR include control DMRS resources, data DMRS resources, even numbered data resource elements (REs), even numbered control REs, or a combination thereof.

Some examples of the method, apparatuses, and non-transitory computer-readable medium described herein may further include operations, features, means, or instructions for selecting the plurality of transmitting UEs for establishing the plurality of unicast connections based on detecting an SCI message from each of the plurality of transmitting UEs, performing a signal quality measurement among the first TRP and the second TRP of the receiving UE for each transmitting UE, or a combination thereof.

In some examples of the method, apparatuses, and non-transitory computer-readable medium described herein, determining the plurality of sets of transmission parameters for the respective transmitting UEs of the plurality of transmitting UEs based on which TRP of the receiving UE may be used for a respective unicast connection with a transmitting UE of the plurality of transmitting UEs.

In some examples of the method, apparatuses, and non-transitory computer-readable medium described herein, a same set of transmission parameters may be used for a first transmitting UE and for a second transmitting UE of the plurality of transmitting UEs based on the a first unicast connection being established between the first transmitting UE and the receiving UE via the first TRP and a second unicast connection being established between the second transmitting UE and the receiving UE via the second TRP.

In some examples of the method, apparatuses, and non-transitory computer-readable medium described herein, determining the plurality of sets of transmission parameters based on one or more signal quality measurements of the plurality of unicast connections.

In some examples of the method, apparatuses, and non-transitory computer-readable medium described herein, the one or more signal quality measurements include a reference signal strength indicator (RSSI) measurement, a reference signal received power (RSRP) measurement, biased information for each of the plurality of transmitting UEs, or a combination thereof.

In some examples of the method, apparatuses, and non-transitory computer-readable medium described herein, each set of transmission parameters includes a transmission schedule adjustment, a transmit power, a transmit time, an indication of the time and frequency resources, or a combination thereof.

A method for wireless communications at a transmitting UE is described. The method may include transmitting, to a receiving UE, a request to establish a unicast connection with a first TRP of multiple TRPs for the receiving UE and receiving, from the receiving UE, a set of transmission parameters to use for subsequent communications on the unicast connection, the set of transmission parameters enabling the receiving UE to receive transmissions from a plurality of transmitting UEs including the transmitting UE on a same set of time and frequency resources via an SDM scheme.

An apparatus for wireless communications at a transmitting UE is described. The apparatus may include a processor, memory in electronic communication with the processor, and instructions stored in the memory. The instructions may be executable by the processor to cause the apparatus to transmit, to a receiving UE, a request to establish a unicast connection with a first TRP of multiple TRPs for the receiving UE and receive, from the receiving UE, a set of transmission parameters to use for subsequent communications on the unicast connection, the set of transmission parameters enabling the receiving UE to receive transmissions from a plurality of transmitting UEs including the transmitting UE on a same set of time and frequency resources via an SDM scheme.

Another apparatus for wireless communications at a transmitting UE is described. The apparatus may include means for transmitting, to a receiving UE, a request to establish a unicast connection with a first TRP of multiple TRPs for the receiving UE and means for receiving, from the receiving UE, a set of transmission parameters to use for subsequent communications on the unicast connection, the set of transmission parameters enabling the receiving UE to receive transmissions from a plurality of transmitting UEs including the transmitting UE on a same set of time and frequency resources via an SDM scheme.

A non-transitory computer-readable medium storing code for wireless communications at a transmitting UE is described. The code may include instructions executable by a processor to transmit, to a receiving UE, a request to establish a unicast connection with a first TRP of multiple TRPs for the receiving UE and receive, from the receiving UE, a set of transmission parameters to use for subsequent communications on the unicast connection, the set of transmission parameters enabling the receiving UE to receive transmissions from a plurality of transmitting UEs including the transmitting UE on a same set of time and frequency resources via an SDM scheme.

In some examples of the method, apparatuses, and non-transitory computer-readable medium described herein, receiving, from the receiving UE, the set of transmission parameters via an SCI message.

In some examples of the method, apparatuses, and non-transitory computer-readable medium described herein, the set of transmission parameters may be indicated via a resource bit map in the SCI message.

In some examples of the method, apparatuses, and non-transitory computer-readable medium described herein, the SCI message includes a second stage SCI message.

Some examples of the method, apparatuses, and non-transitory computer-readable medium described herein may further include operations, features, means, or instructions for receiving, from the receiving UE, an indication for a control DMRS cyclic shift to use for the subsequent communications, where the control DMRS cyclic shift further enables the receiving UE to receive the transmissions from the plurality of transmitting UEs on the same set of time and frequency resources via the SDM scheme.

In some examples of the method, apparatuses, and non-transitory computer-readable medium described herein, receiving, from the receiving UE, the indication for the control DMRS cyclic shift via an SCI message.

In some examples of the method, apparatuses, and non-transitory computer-readable medium described herein, the SCI message includes a second stage SCI message for UE coordination.

Some examples of the method, apparatuses, and non-transitory computer-readable medium described herein may further include operations, features, means, or instructions for receiving, from the receiving UE, an indication of a CMR and an IMR for the subsequent communications.

In some examples of the method, apparatuses, and non-transitory computer-readable medium described herein, receiving, from the receiving UE, the indication of the CMR and the IMR via an SCI message.

In some examples of the method, apparatuses, and non-transitory computer-readable medium described herein, the SCI message includes a second stage SCI message for UE coordination.

Some examples of the method, apparatuses, and non-transitory computer-readable medium described herein may further include operations, features, means, or instructions for transmitting, to the receiving UE, a zero power resource using the CMR, the IMR, or both.

Some examples of the method, apparatuses, and non-transitory computer-readable medium described herein may further include operations, features, means, or instructions for determining to transmit a trigger for the receiving UE to transmit the indication of the CMR and the IMR.

In some examples of the method, apparatuses, and non-transitory computer-readable medium described herein, determining to transmit the trigger based on a CBR measurement, a number of consecutive transmission failures satisfying a threshold value, or a combination thereof.

In some examples of the method, apparatuses, and non-transitory computer-readable medium described herein, the CMR and the IMR may be part of a CSI-RS configuration.

In some examples of the method, apparatuses, and non-transitory computer-readable medium described herein, the CMR and the IMR include control DMRS resources, data DMRS resources, even numbered data REs, even numbered control REs, or a combination thereof.

In some examples of the method, apparatuses, and non-transitory computer-readable medium described herein, the set of transmission parameters includes a transmission schedule adjustment, a transmit power, a transmit time, an indication of the time and frequency resources, or a combination thereof.

DETAILED DESCRIPTION

Figure 1:
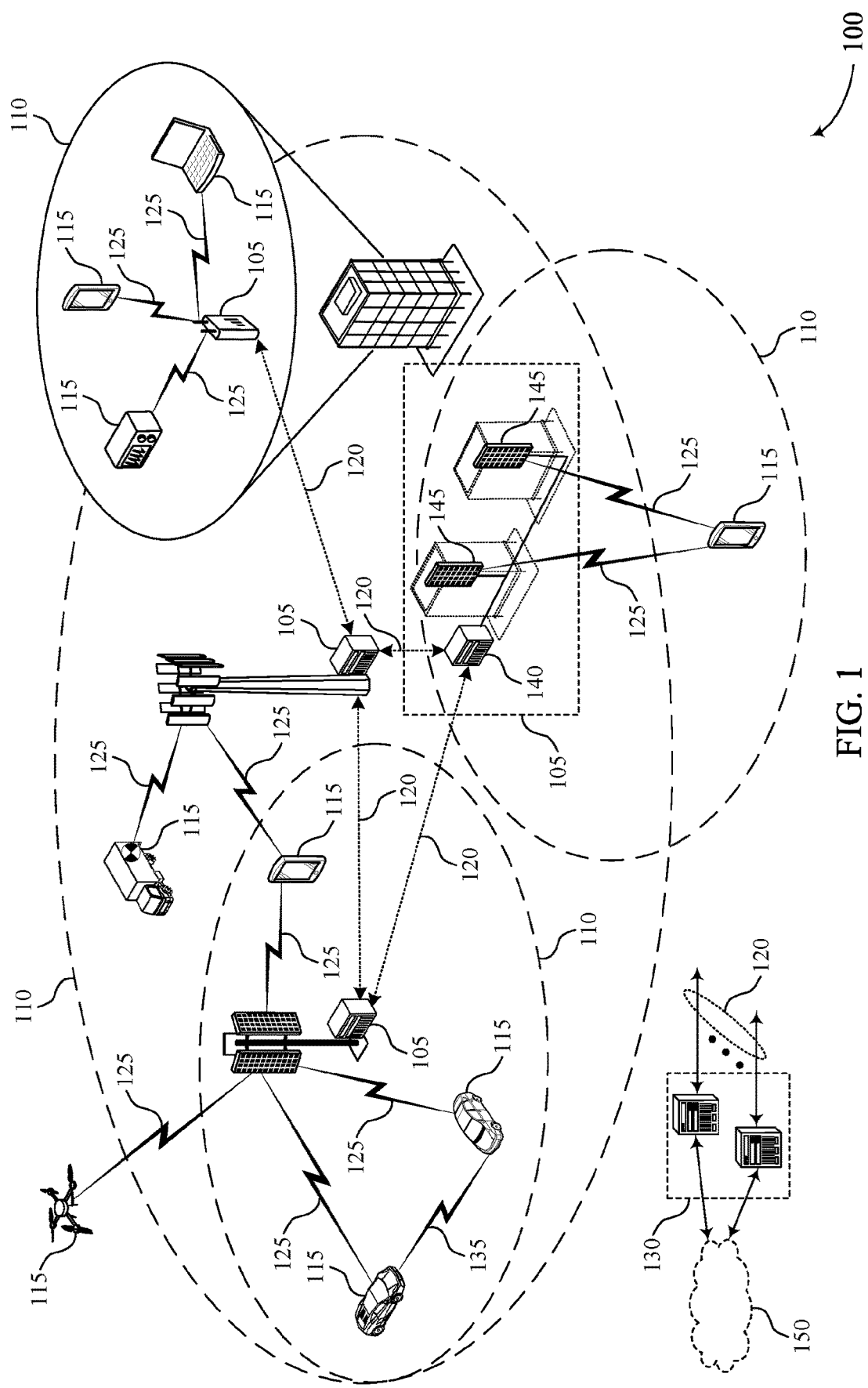
FIG. 1 illustrates an example of a wireless communications system that supports unicast coordination for spatial division multiplexing (SDM) communications in accordance with aspects of the present disclosure.

For vehicle-to-everything (V2X) communications, two or more vehicles (e.g., two or more user equipment (UE)) may communicate with each other via broadcast transmissions, groupcast connections, or unicast connections. For the unicast connections, a first UE (e.g., a receiving UE) may establish multiple unicast connections with multiple other UEs (e.g., transmitting UEs), where the multiple other UEs communicate with the first UE via different transmission reception points (TRPs) of the first UE. For example, the first UE may be a vehicle and include a first TRP at the front of the vehicle and a second TRP at the rear of the vehicle. Accordingly, the first TRP may be used to communicate with other vehicles in front of the first UE, and the second TRP may be used to communicate with other vehicles behind the first UE. However, as the number of UEs/vehicles increases with which the first UE establishes unicast connections, resources allocated for the V2X communications may become overburdened if communications via the unicast connections happen at different times, and the first UE may not successfully receive or transmit messages with each of the multiple other UEs, thereby impacting the V2X communications.

As described herein, for unicast communications, to make effective use of V2X resources and enable a reliable spatial division multiplexing (SDM) reception, a receiving UE (e.g., the first UE) may coordinate the schedules with all transmitting UEs (e.g., based on V2X service type and/or directional transmission characteristics with multi-TRPs). For example, the receiving UE may establish multiple unicast connections with various transmitting UEs and may determine sets of transmission parameters for each of the transmitting UEs to enable SDM reception at the receiving UE from the transmitting UEs. That is, the receiving UE may request the transmitting UEs (e.g., via a set of transmission parameters) to adjust their schedules, transmit powers, and transmit time to enable SDM at the receiving UE based on power measurements (e.g., reference signal strength indicator (RSSI), reference signal received power (RSRP), etc.) of each TRP, transmitter UE biased information, etc.

Accordingly, transmissions from a given SDMed transmitter UE may be received in a separate TRP considering transmission directionality and imbalanced per-TRP power measurements. In some cases, the receiving UE may transmit the set of transmission parameters via a second-stage sidelink control information (SCI) message. Additionally, the receiving UE may transmit an indication of a demodulation reference signal (DMRS) cyclic shift and/or an indication of a channel measurement resource (CMR) and interference measurement resource (IMR) to the transmitting UEs to further enable the receiving UE to SDM transmissions from the transmitting UEs on a same set of time and frequency resources.

Aspects of the disclosure are initially described in the context of wireless communications systems. Additionally, aspects of the disclosure are illustrated by an additional wireless communications system, cast types, a link establishment, a physical channel structure, unicast establishments, a resource pattern, and a process flow. Aspects of the disclosure are further illustrated by and described with reference to apparatus diagrams, system diagrams, and flowcharts that relate to unicast coordination for SDM communications.

FIG. 1 illustrates an example of a wireless communications system 100 that supports unicast coordination for SDM communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or TRPs. Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using V2X communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

For V2X communications, two or more vehicles (e.g., two or more UEs 115) may communicate with each other via broadcast transmissions, groupcast connections, or unicast connections. For the unicast connections, a first UE 115 (e.g., a receiving UE 115) may establish multiple unicast connections with multiple other UEs 115 (e.g., transmitting UEs 115). However, as the number of UEs/vehicles increases with which the first UE 115 establishes unicast connections, resources allocated for the V2X communications may become overburdened if communications via the unicast connections happen at different times and on different resources in the allocated V2X resources, and the first UE 115 may not successfully receive or transmit messages with each of the multiple other UEs 115, thereby impacting the V2X communications.

Wireless communications system 100 may support an effective use of V2X resources for unicast communications based on a receiving UE 115 (e.g., the first UE 115) coordinating transmissions for multiple transmitting UEs 115 with which the receiving UE 115 has established unicast connections (e.g., unicast links) to enable SDM at the receiving UE 115 for received messages from the multiple transmitting UEs 115 on a same set of time and frequency resources. For example, the receiving UE 115 may establish multiple unicast connections with various transmitting UEs 115 and may determine sets of transmission parameters for each of the transmitting UEs 115 to enable SDM reception at the receiving UE 115 of messages from the transmitting UEs 115. That is, the receiving UE 115 may request the transmitting UEs 115 (e.g., via transmitting a respective set of transmission parameters to each transmitting UE 115) to adjust their schedules, transmit powers, and transmit time to enable SDM at the receiving UE, where the different transmission parameters are based on power measurements (e.g., RSSI, RSRP, etc.) of each TRP, transmitter UE biased information, or a combination thereof. In some implementations, the receiving UE 115 may transmit the set of transmission parameters to each transmitting UE 115 via a second-stage SCI message.

Figure 2:
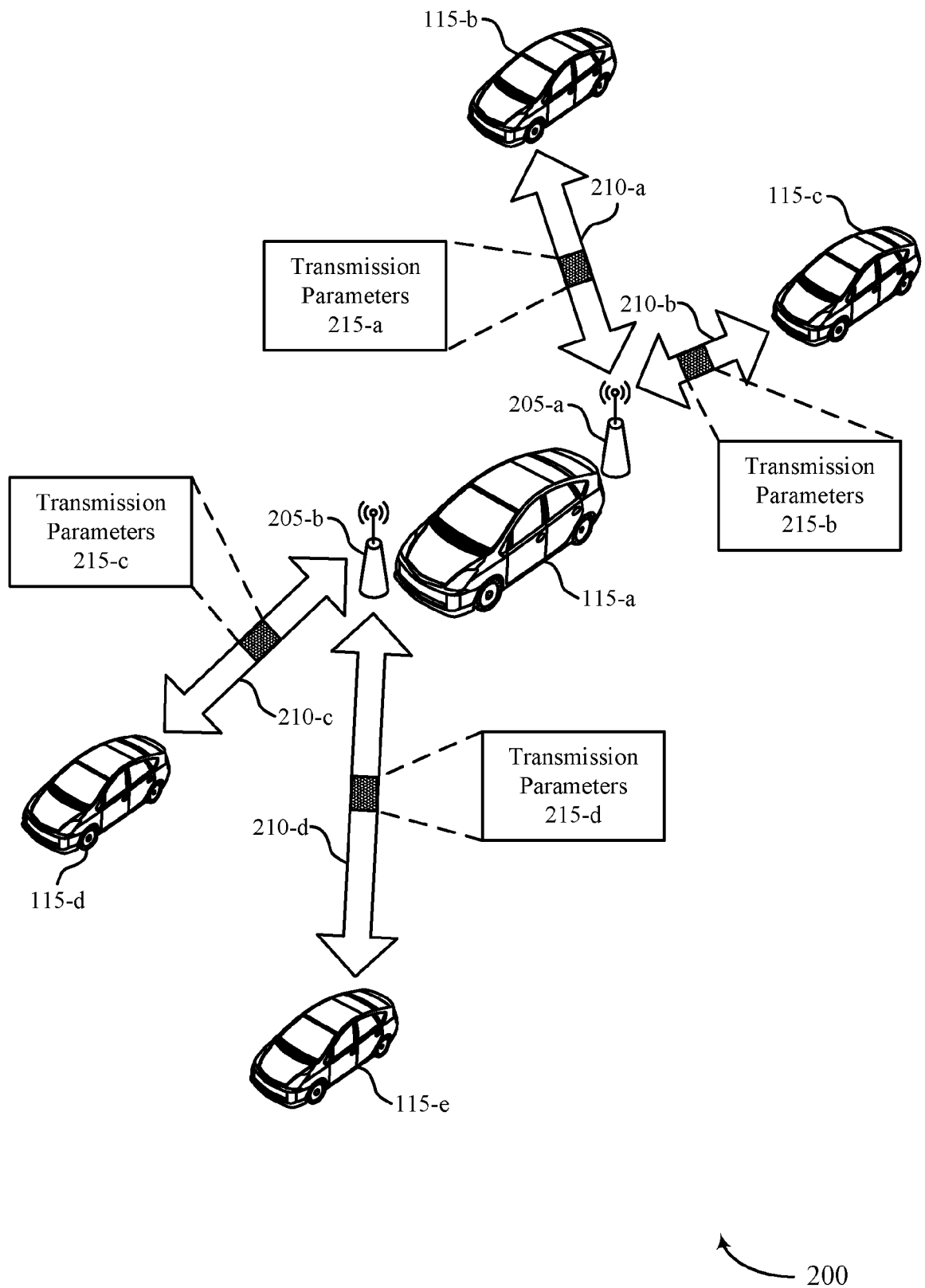
FIG. 2 illustrates an example of a wireless communications system that supports unicast coordination for SDM communications in accordance with aspects of the present disclosure.
Figure 3A:
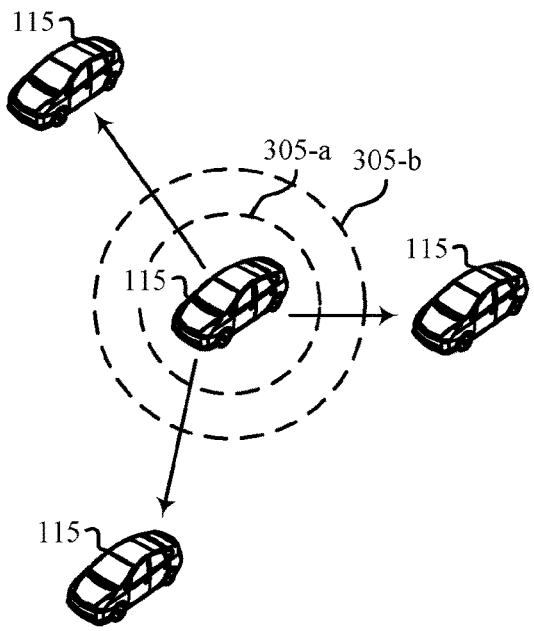
FIGS. 3A, 3B, 3C, and 3D illustrate examples of cast types in accordance with aspects of the present disclosure.
Figure 3B:
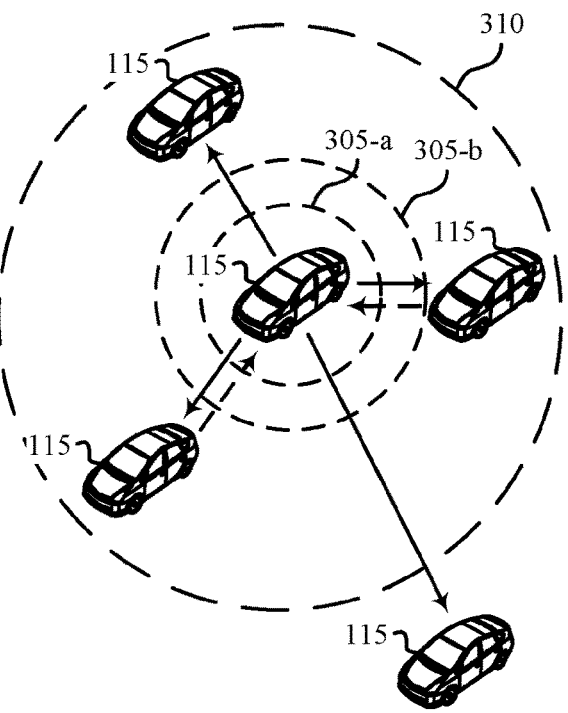
Figure 3C:
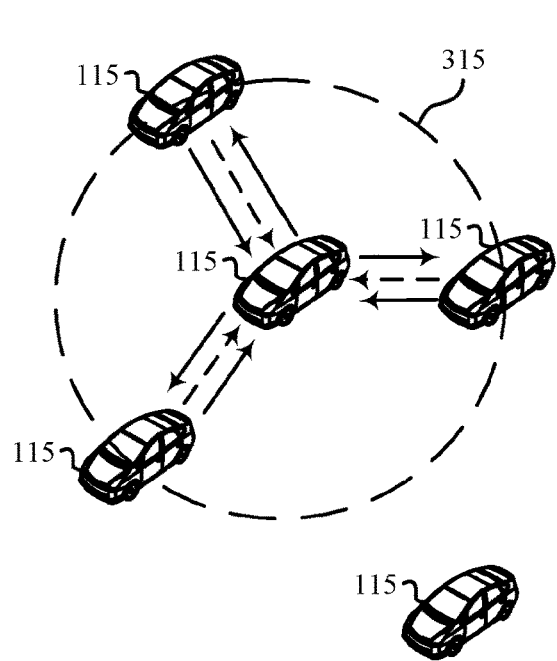
Figure 3D:
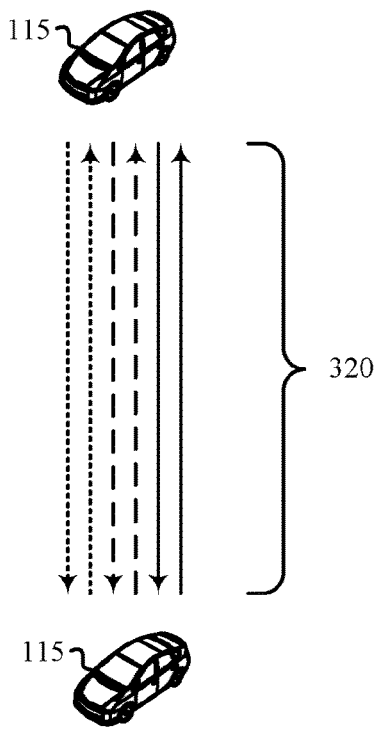

FIG. 2 illustrates an example of a wireless communications system 200 that supports unicast coordination for SDM communications in accordance with aspects of the present disclosure. Wireless communications system 200 may implement aspects of wireless communications system 100. For example, wireless communications system 200 may include multiple UEs 115, such as a receiving UE 115-a, a first transmitting UE 115-b, a second transmitting UE 115-c, a third transmitting UE 115-d, and a fourth transmitting UE 115-e, which may represent examples of UEs 115 as described with reference to FIG. 1. Wireless communications system 200 may also support V2X communications between receiving UE 115-a and the transmitting UEs 115, where the V2X communications may include sidelink communications between the UEs 115.

Additionally, receiving UE 115-a may include multiple TRPs 205 for communications with the different transmitting UEs 115. Multi-TRP sidelink communications may enhance coverage for the communications between receiving UE 115-a and the transmitting UEs 115. Additionally, the multiple TRPs 205 may improve reliability, coverage, and capacity performance through flexible deployment scenarios. More specifically, multiple TRPs 205 equipped in different part of vehicles (e.g., in receiving UE 115-a) may improve reliability in safety and other high robustness desired applications. In some cases, from a transmission point of view, data coverage may be biased. For example, side coverage may not be importance for certain cases (e.g., TRPs located on the side of a vehicle may not provide much value), and front or back biased or 360-degree coverage around the vehicle may be dependent on a packet content or type. From a receiver point of view, the multiple TRPs 205 at the vehicles may desire for 360-degree coverage. As such, receiving UE 115-*a* may use both TRPs 205 to receive packets from other UEs 115 (e.g., the transmitting UEs 115).

As shown, receiving UE 115-*a* may include a first TRP 205-*a* at the rear of the vehicle and a second TRP 205-*b* at the front of the vehicle. Accordingly, receiving UE 115-*a* may receive packets from the first transmitting UE 115-*b* and the second transmitting UE 115-*c* via first TRP 205-*a* and may receive packets from the third transmitting UE 115-*d* and the fourth transmitting UE 115-*e* via second TRP 205-*b*. With each TRP 205, receiving UE 115-*a* may establish respective unicast connections (e.g., unicast links) with each transmitting UE 115. For example, receiving UE 115-*a* may establish a first unicast connection 210-*a* with the first transmitting UE 115-*b* via first TRP 205-*a*, a second unicast connection 210-*b* with the second transmitting UE 115-*c* via first TRP 205-*a*, a third unicast connection 210-*c* with the third transmitting UE 115-*d* via second TRP 205-*b*, and a fourth unicast connection 210-*d* with the fourth transmitting UE 115-*e* via second TRP 205-*b*. In some cases, each unicast connection 210 may be referred to as a PC5 unicast link based on the sidelink communications between the receiving UE 115-*a* and each of the transmitting UEs 115 and that the sidelink communications occur over a PC5 interface.

As described herein, to make effective use of V2X resources (e.g., time and frequency resources allocated for the V2X communications) and to enable reliable SDM reception using the unicast connections 210, receiving UE 115-*a* may coordinate schedules with all the transmitting UEs 115. In some implementations, the schedule coordination may be in view of, for example, a V2X service type and/or directional transmission characteristics based on the multiple TRPs 205. That is, receiving UE 115-*a* may coordinate how each of the transmitting UEs 115 should transmit packets based on a V2X service type, with which TRP 205 each transmitting UE 115 is connected to receiving UE 115-*a*, or both. Additionally, by coordinating the schedule for all the transmitting UEs 115, receiving UE 115-*a* may be able to receive the packets from the transmitting UEs 115 on a same set of time and frequency resources (e.g., at the same time on a same set of frequencies) using an SDM configuration or scheme. Accordingly, receiving UE 115-*a* may receive V2X service data from the multiple transmitting UEs 115 via the respective unicast connections 210, where the received V2X service data can be SDMed at receiving UE 115-*a* from the transmitting UEs 115 according to transmission directionality (e.g., measured via RSRP) at receiving UE 115-*a*.

As part of coordinating the schedules with the transmitting UEs 115, receiving UE 115-*a* may request each transmitting UE 115 to adjust their schedules, transmit powers, and transmit times (e.g., transmission parameters) to enable SDM reception at receiving UE 115-*a*. In some implementations, receiving UE 115-*a* may determine the adjustments for each transmitting UE 115 based on an RSSI or RSRP measurement of each TRP 205 of receiving UE 115-*a*, on transmission biased information, or a combination thereof. That is, packets from one of the SDMed transmitter UEs 115 may be received in a separate TRP 205 considering transmission directionality and imbalanced per-TRP power measurement. In this case, receiving UE 115-*a* may instruct recommended time and frequency resources to the transmitting UEs 115 to allow different transmitting UEs 115 to use the same or overlapping resources. Accordingly, based on these techniques, SDM reception in the various unicast connections may be supported by receiving UE 115-*a* (e.g., a multi-TRP capable UE). Receiving UE 115-*a* may indicate the coordination information (e.g., sets of transmission parameters) to the transmitting UEs 115 as part of a second-stage SCI message (e.g., as a resource bit map).

For example, receiving UE 115 may determine different sets of transmission parameters 215 for each of the transmitting UEs 115 and then may transmit each set of transmission parameters 215 to the respective transmitting UEs 115. As shown, receiving UE 115-*a* may transmit a first set of transmission parameters 215-*a* to the first transmitting UE 115-*b* via the first unicast connection 210-*a*, a second set of transmission parameters 215-*b* to the second transmitting UE 115-*c* via the second unicast connection 210-*b*, a third set of transmission parameters 215-*c* to the third transmitting UE 115-*d* via the third unicast connection 210-*c*, and a fourth set of transmission parameters 215-*d* to the fourth transmitting UE 115-*e* via the fourth unicast connection 210-*d*. These transmission parameters 215 may enable the SDM reception of packets from the transmitting UEs 115 at receiving UE 115-*a* by adjusting transmit powers of the different transmitting UEs 115, allowing receiving UE 115-*a* to identify the individual packet transmissions from each transmitting UE 115 on the same set of time and frequency resources based on the different transmit powers.

Additionally, based on the multiple TRPs 205, receiving UE 115-*a* may indicate same coordination information to a transmitting UE 115 connected to first TRP 205-*a* (e.g., first transmitting UE 115-*b* or second transmitting UE 115-*c*) and to a transmitting UE 115 connected to second TRP 205-*b* (e.g., third transmitting UE 115-*d* or fourth transmitting UE 115-*e*). That is, the coordination information for each transmitting UE 115 may be determined on a per-TRP basis. Receiving UE 115-*a* may be able to determine the coordination information per-TRP because transmissions received on first TRP 205-*a* may have a minimal impact on transmissions received on second TRP 205-*b* based on directional transmissions (e.g., beamformed transmissions) from the different transmitting UEs 115.

In some implementations, receiving UE 115-*a* may determine additional parameters or information for each of the transmitting UEs 115 and transmit these additional parameters or information to each transmitting UE 115 to further enable receiving UE 115-*a* to receive the packets from the transmitting UEs 115 on the same set of time and frequency resources and enable the SDM reception of the packets. For example, receiving UE 115-*a* may determine and indicate recommended control DMRS cyclic shifts to each transmitting UE 115, where the recommended control DMRS cyclic shifts may indicate different coding resources for each transmitting UE 115 for enabling reception of the packets at receiving UE 115-*a* on the colliding time and frequency resources. Additionally or alternatively, receiving UE 115-*a* may determine and indicate recommended CMR(s) and IMR(s) to each of the transmitting UEs 115, which may enable receiving UE 115 to perform an accurate channel estimation for then combining packets among the multiple TRPs 205.

FIGS. 3A, 3B, 3C, and 3D illustrate examples of cast types 300, 301, 302, and 303 in accordance with aspects of the present disclosure. Cast types 300, 301, 302, and 303 may implement aspects of wireless communications systems 100 and 200. For example, cast types 300, 301, 302, and 303 may include one or more UEs 115, where the UEs 115 communicate with each other via sidelinks and V2X communications.

Cast type 300 may represent a broadcast configuration for a UE 115 to transmit V2X packets or information to one or more UEs 115. For example, cast type 300 may include one or more broadcasts 305-a and 305-b that are transmitted by a UE 115 and are available for any nearby UEs 115 to receive. The broadcasts 305 may not be directed or transmitted specifically to any UE 115 and rather may be transmitted in all directions from a UE 115. The broadcasts 305 may include V2X data for nearby UEs 115.

Cast type 301 may represent a connectionless groupcast configuration for a UE 115 to transmit V2X packets or information to one or more UEs 115. The connectionless groupcast configuration may be a negative acknowledgment (NACK) based configuration. For example, a UE 115 may first transmit V2X data out to nearby UEs 115 using broadcasts 305-a and 305-b for a range 310 and may receive a NACK feedback message (e.g., a physical (PHY) layer acknowledgment feedback message) from one or more of the nearby UEs 115 (e.g., indicating the V2X data was unsuccessfully received). Subsequently, the UE 115 may then retransmit the V2X data specifically to those UEs 115 that transmitted the NACK feedback message.

Cast type 302 may represent a managed groupcast configuration for a UE 115 to transmit V2X packets or information to one or more UEs 115. The managed groupcast configuration may be a positive acknowledgment (ACK) based configuration. For example, a UE 115 may first transmit V2X data to a managed group 315 of UEs 115, where after receiving an ACK from one or more UEs 115 in the managed group, the UE 115 may then receive V2X data from the one or more UEs 115.

Cast type 303 may represent a unicast configuration for a UE 115 to transmit V2X packets or information to an additional, single UE 115. With the unicast configuration, the UE 115 and the additional UE 115 may exchange one or more messages 320. For example, the two UEs 115 may first exchange control signaling to establish the unicast connection (e.g., unicast link) via different layers (e.g., PC5 sidelink (PC5-S), PC5-RRC, etc.). Then, the two UEs 115 may exchange acknowledgment feedback to indicate whether the unicast connection was successfully established before then transmitting V2X data between each other.

Figure 4:
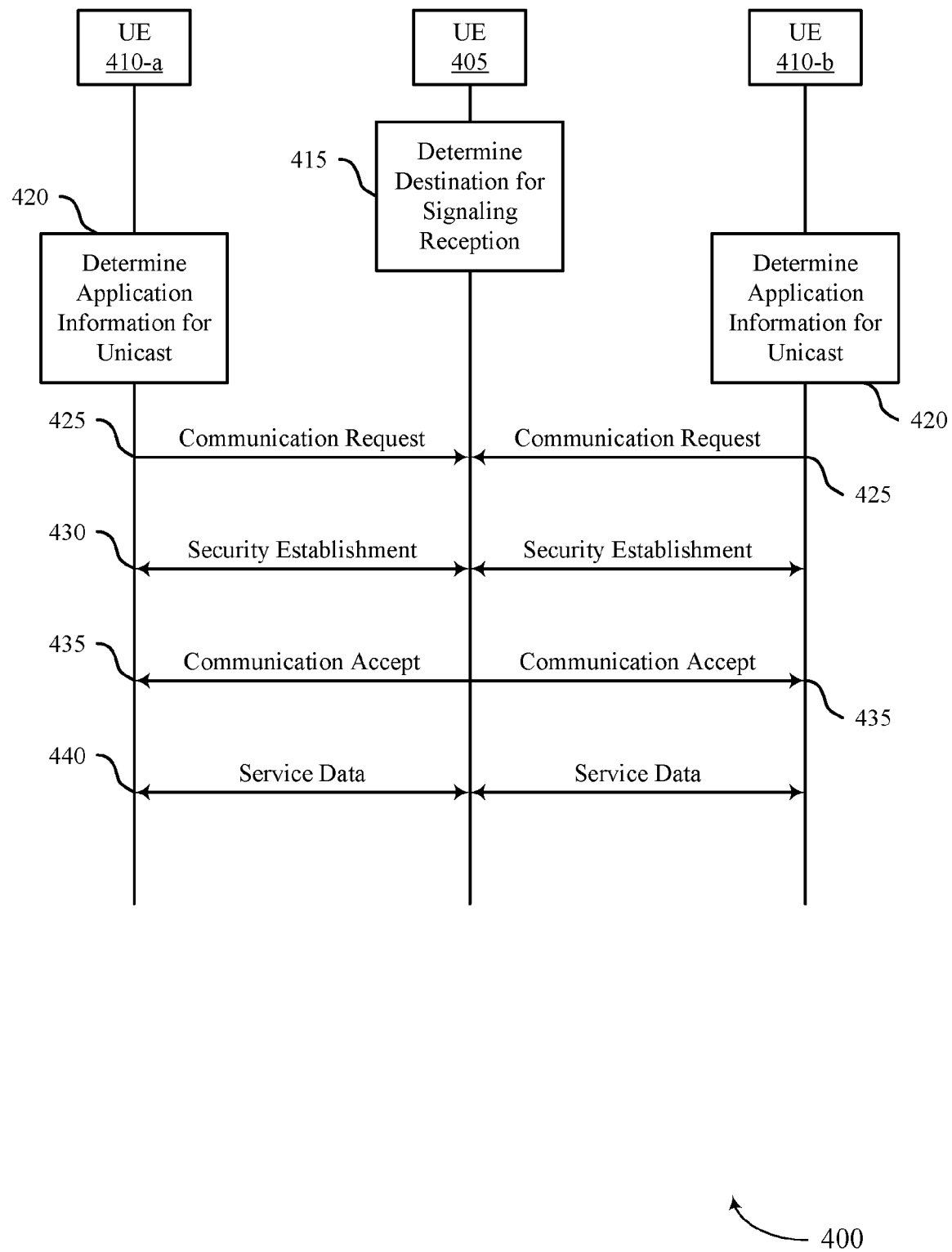
FIG. 4 illustrates an example of a link establishment in accordance with aspects of the present disclosure.

FIG. 4 illustrates an example of a link establishment 400 in accordance with aspects of the present disclosure. Link establishment 400 may implement aspects of wireless communications systems 100 and 200. For example, link establishment 400 may include a receiving UE 405 and one or more transmitting UEs 410, such as a first transmitting UE 410-a and a second transmitting UE 410-b. Link establishment 400 may represent a layer-2 link establishment for multiple unicast connections. For example, receiving UE 405 may establish multiple PC5 unicast connections (e.g., unicast links) with multiple peer UEs 115. That is, both the first transmitting UE 410-a and the second transmitting UE 410-b may establish unicast connections with receiving UE 405 according to link establishment 400.

At 415, receiving UE 405 may determine a destination layer-2 identification for signaling reception. For example, receiving UE 405 may determine the transmitting UEs 410 for signaling reception and identifications of the transmitting UEs 115.

At 420, a V2X application layer of the transmitting UEs 410 may provide application information for the transmitting UEs 410 for a PC5 unicast communication with receiving UE 405. At 425, the transmitting UEs 410 may transmit a direct communication request to receiving UE 405 based on the application information provided by the V2X application layer.

At 430, receiving UE 405 may perform a security establishment with the transmitting UEs 410 based on the direct communication request. At 435, after establishing the security, receiving UE 405 may transmit a direct communication accept message to each transmitting UE 410 via respective unicast connections (e.g., unicast links). Subsequently, at 440, receiving UE 405 and the transmitting UEs 410 may begin transmitting V2X service data to each other over the unicast connections. For example, receiving UE 405 may receive V2X service data from both the first transmitting UE 410-a and the second transmitting UE 410-b with dedicated unicast connections.

Figure 5:
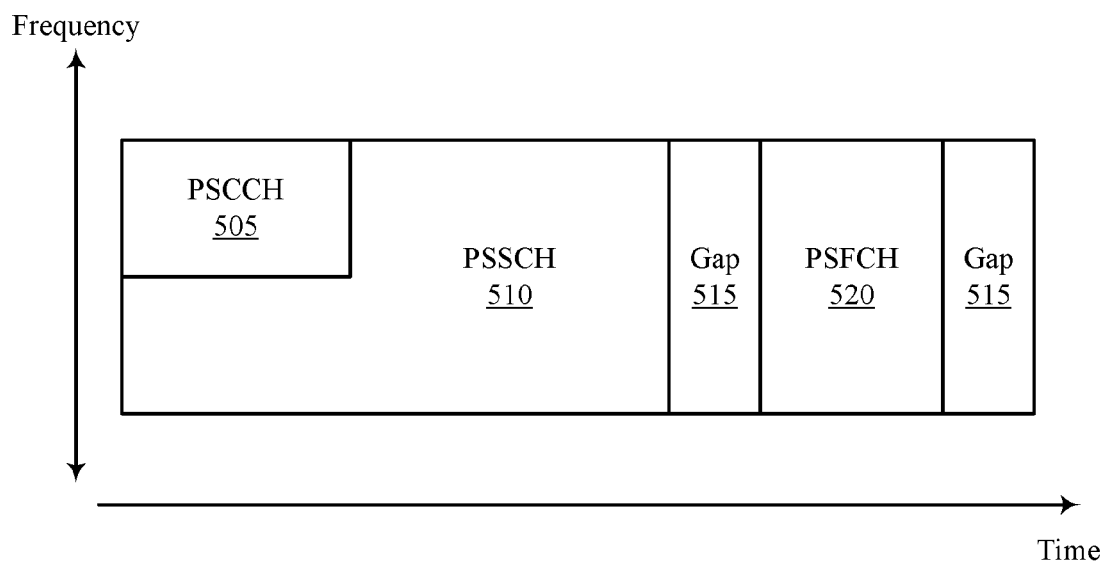
FIG. 5 illustrates an example of a physical channel structure in accordance with aspects of the present disclosure.

FIG. 5 illustrates an example of a physical channel structure 500 in accordance with aspects of the present disclosure. Physical channel structure 500 may implement aspects of wireless communications systems 100 and 200. For example, two UEs 115 may communicate with each other using sidelink communications that are configured based on physical channel structure 500. Physical channel structure 500 may be used for resource reservation and PHY layer processing. Additionally, physical channel structure 500 may be used for both periodic and aperiodic transmissions. In some cases, a transmission may reserve resources in a current slot and in up to two future slots.

Physical channel structure 500 may include a physical sidelink control channel (PSCCH) 505, a physical sidelink shared channel (PSSCH) 510, one or more gaps 515, and a physical sidelink feedback channel (PSFCH) 520. A first stage control message (e.g., a first SCI message, SCI-1, etc.) may be transmitted on PSCCH 505 and may contain information for resource allocation and for decoding a second stage control message. PSCCH 505 may be limited to a single sub-channel, and a frequency domain orthogonal cover code (FD-OCC) may be applied to DMRS to reduce impact of colliding PSCCH transmissions. In some cases, a transmitter UE 115 may randomly select the FD-OCC from a set of pre-defined FD-OCCs. A second stage control message (e.g., a second SCI message, SCI-2, etc.) may be transmitted on PSSCH 510 and may contain information for decoding data (e.g., shared channel (SCH) transmissions). Accordingly, a receiver UE 115 may decode the SCI firstly (e.g., both the first stage control message and the second stage control message) and then decode the data. Subsequently, the receiver UE 115 may then transmit feedback (e.g., HARQ feedback) on resources in PSFCH 520 after the gap 515 according to a cast type and a feedback mode.

Accordingly, as described herein, when multiple unicast connections are established between a receiving UE 115 and multiple transmitting UEs 115 and to enable SDM reception of packets from the multiple transmitting UEs 115, the receiving UE 115 may determine transmission parameters (e.g., coordination information) for each of the multiple transmitting UEs 115 and may transmit the determined transmission parameters to the respective transmitting UEs 115 via the second stage control message in PSSCH 510.

Figure 6:
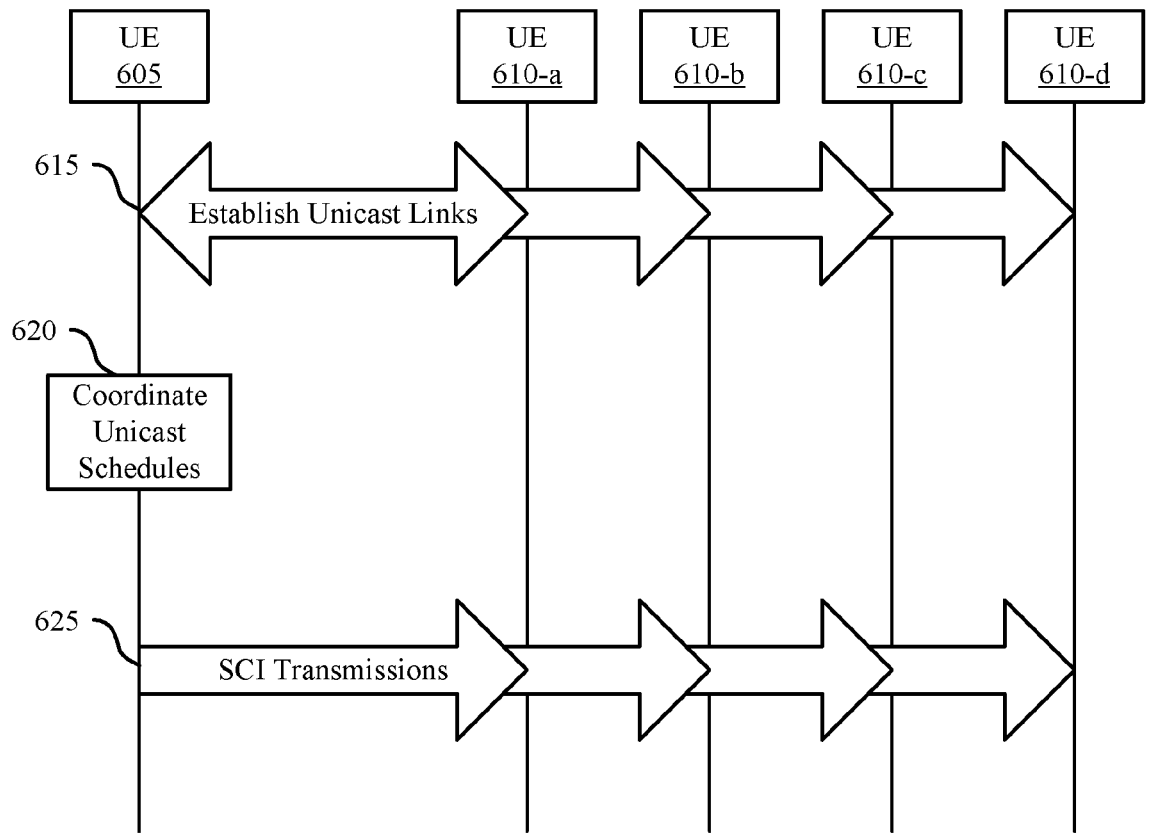
FIGS. 6 and 7 illustrate examples of unicast establishments that supports unicast coordination for SDM communications in accordance with aspects of the present disclosure.

FIG. 6 illustrates an example of a unicast establishment 600 that supports unicast coordination for SDM communications in accordance with aspects of the present disclosure. Unicast establishment 600 may implement aspects of wireless communications systems 100 and 200. For example, unicast establishment 600 may include a receiving UE 605 and one or more transmitting UEs 610, such as a first transmitting UE 610-*a*, a second transmitting UE 610-*b*, a third transmitting UE 610-*c*, and a fourth transmitting UE 610-*d*.

At 615, receiving UE 605 and each of the transmitting UEs 610 may establish respective unicast links (e.g., unicast connections). For example, the unicast links may be established as described previously with reference to FIG. 4.

At 620, with multiple unicast links established, for SDM reception, in order to decode SCI (e.g., sidelink packets) in colliding time and frequency resources, receiving UE 605 may coordinate unicast schedules to enable reliable SDM reception with the transmitting UEs 610. As part of coordinating the unicast schedules, receiving UE 605 may At 625, receiving UE 605 may transmit an SCI transmission (e.g., second stage SCI) to each transmitting UE 610 to indicate transmission parameters for the coordinating of the unicast schedules. Additionally, receiving UE 605 may indicate a recommended control DMRS cyclic shift to be used by each SDMed transmitting UE 615 to guarantee accurate channel and a signal-to-interference-plus-noise ratio (SINR) estimation. For example, receiving UE 605 may indicate the recommended cyclic shift used for subsequent SCI transmissions sent by the transmitting UEs 610 to avoid resource collision leading to detection failure. The recommend control DMRS cyclic shift may be used to differentiate coding resource among the SDMed transmitting UEs 610, and receiving UE 605 may transmit the recommended control DMRS cyclic shifts via a second stage SCI as part of UE coordination information. In some implementation, the selection of the transmitting UEs 610 for the SDM reception may be based on an SCI detection and signal measurements (e.g., RSRP or RSSI measurements) among multiple TPRs located in receiving UE 605.

Figure 7:
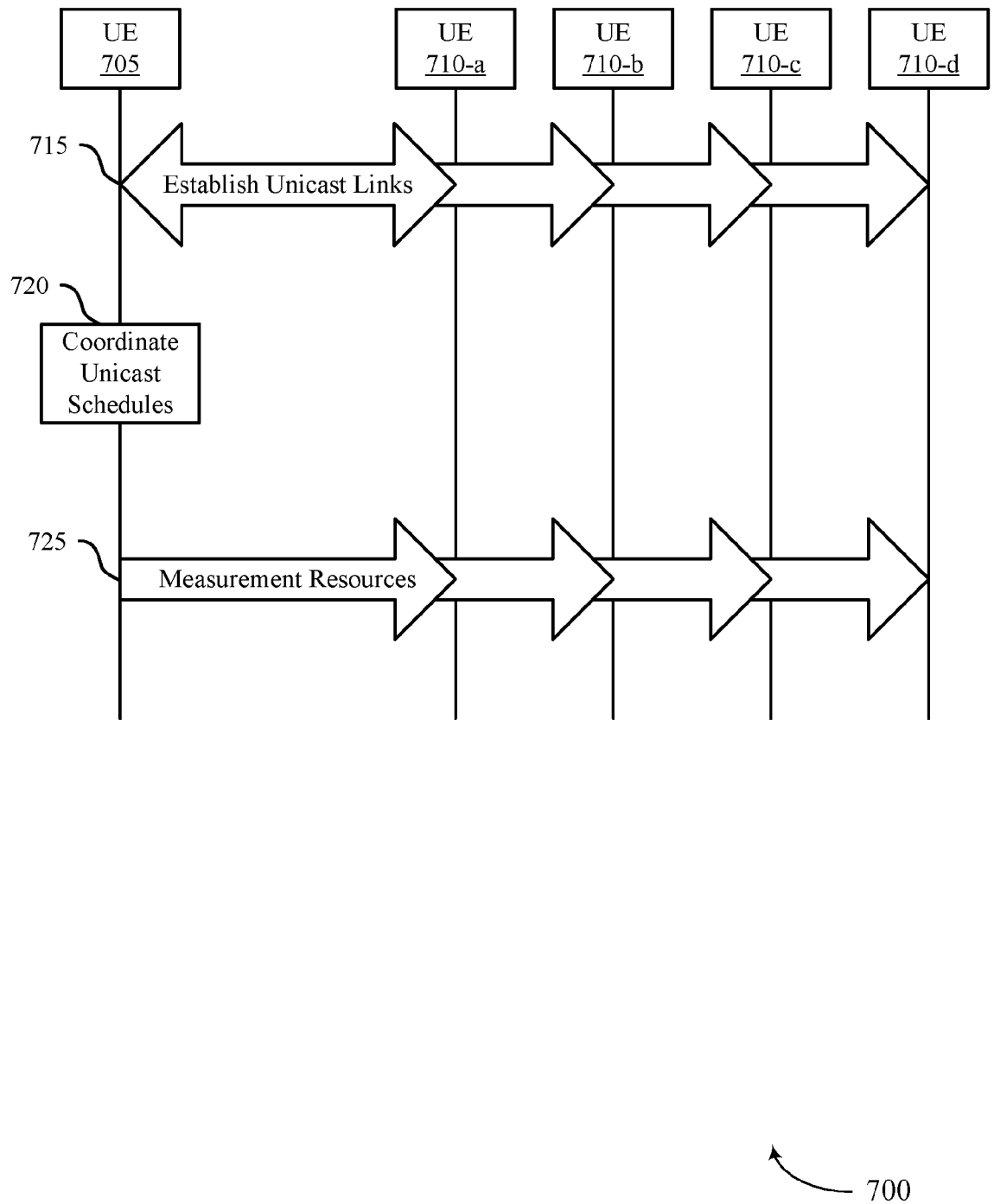

FIG. 7 illustrates an example of a unicast establishment 700 that supports unicast coordination for SDM communications in accordance with aspects of the present disclosure. Unicast establishment 700 may implement aspects of wireless communications systems 100 and 200. For example, unicast establishment 700 may include a receiving UE 705 and one or more transmitting UEs 710, such as a first transmitting UE 710-*a*, a second transmitting UE 710-*b*, a third transmitting UE 710-*c*, and a fourth transmitting UE 710-*d*.

At 715, receiving UE 705 and each of the transmitting UEs 710 may establish respective unicast links (e.g., unicast connections). For example, the unicast links may be established as described previously with reference to FIG. 4.

At 720, with multiple unicast links established, for SDM reception, in order to decode SCI (e.g., sidelink packets) in colliding time and frequency resources, receiving UE 705 may coordinate unicast schedules to enable reliable SDM reception with the transmitting UEs 710. Additionally, to enable reliable SDM reception, receiving UE 705 may indicate a recommended CMR and IMR to each SDMed transmitting UE 710. The recommended CMR and IMR may enable receiving UE 705 to yield accurate channel or SINR estimation for reception combining among multiple TRPs located in receiving UE 705 or to decide if reception combining is doable. For example, receiving UE 705 may use the recommend CMR and IMR as part of estimating channel and interference levels at colliding time and frequency resources used by the SDMed transmitting UEs 710 among the multiple TRPs located in receiving UE 705. In some implementation, receiving UE 705 may transmit this indication of the CMR and IMR via a second stage SCI as part of UE coordination information.

Figure 8:
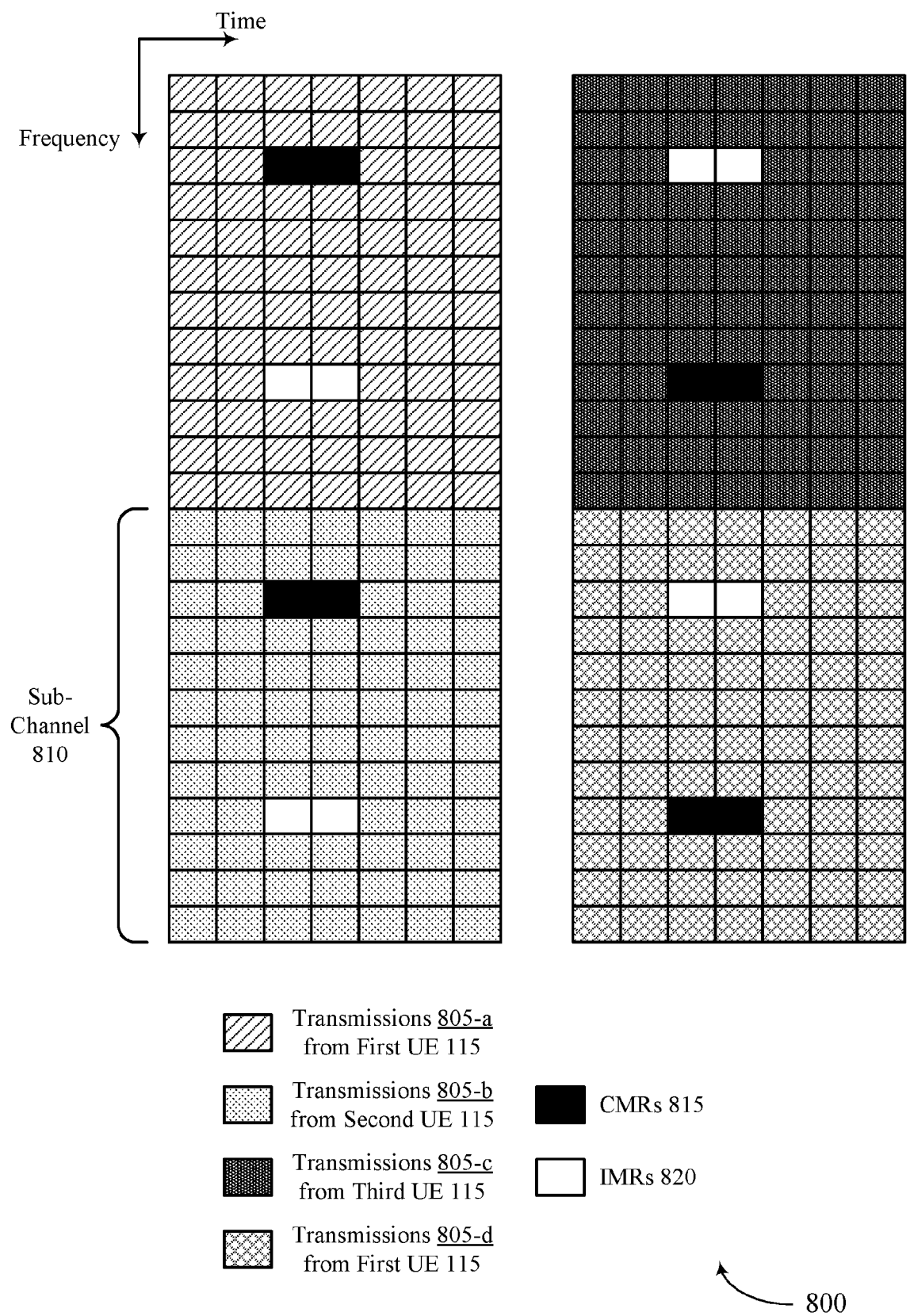
FIG. 8 illustrates an example of a resource pattern that supports unicast coordination for SDM communications in accordance with aspects of the present disclosure.

FIG. 8 illustrates an example of a resource pattern 800 that supports unicast coordination for SDM communications in accordance with aspects of the present disclosure. Resource pattern 800 may implement aspects of wireless communications systems 100 and 200. For example, a receiving UE 115 may transmit an indication of resource pattern 800 to one or more transmitting UEs 115 to enable the receiving UE 115 to SDM transmissions received from the transmitting UEs 115 on a same set of time and frequency resources. As shown, the receiving UE may receive first transmissions 805-*a* from a first transmitting UE 115, second transmissions 805-*b* from a second transmitting UE 115, third transmissions 805-*c* from a third transmitting UE 115, and fourth transmissions 805-*d* from a fourth transmitting UE 115. The transmissions 805 from each transmitting UE 115 may be located on separate sub-channels 810. In some implementations, the first transmissions 805-*a* and the second transmissions 805-*b* may be SDMed at the receiving UE 115 (e.g., via a first TRP), and the third transmissions 805-*c* and the fourth transmissions 805-*d* may be SDMed at the receiving UE 115 (e.g., via a second TRP).

Additionally, resource pattern 800 may include one or more CMRs 815 and one or more IMRs 820. As described previously with reference to FIG. 7, the CMR(s) 815 and the IMR(s) 820 may be used by the receiving UE 115 to yield accurate channel or SINR estimation for reception combining among multiple TRPs located in the receiving UE 115 or to decide if reception combining is doable. Additionally, the receiving UE 115 may transmit an indication of the CMRs 815 and the IMRs 820 via a second stage SCI (e.g., with an indication of resource pattern 800 or independently of the indication of resource pattern 800).

In some implementations, the CMRs 815 and IMRs 820 may be as part of a channel state information reference signal (CSI-RS) configuration. Additionally or alternatively, the CMRs 815 and the IMRs 820 may be as part of a control DMRS, a data DMRS, or even data or control resource elements (REs).

Additionally, one or more of the transmitting UEs 115 may introduce zero power (ZP) resources to enable the receiving UE 115 to estimate the interference power from other SDMed transmitting UEs 115. For example, the one or more transmitting UEs 115 may transmit the ZP resources using the IMRs 820 used for interference measurement in the receiving UE 115 when SDM reception is enabled. The receiving UE 115 may then use the IMRs 820 to estimate per-TRP interference measurements and to decide if reception combining across the TRPs is enabled.

To enable reliable SDM receiving, the receiving UE 115 may decide to trigger the CMRs 815 and IMRs 820 scheduling. For example, the receiving UE 115 may determine to trigger the CMRs 815 and IMRs 820 scheduling based on resource reservation information decoded by an SDM receiving procedure, a channel busy ratio (CBR) measurement, etc. Additionally or alternatively, the CMRs 815 and IMRs 820 may be triggered or scheduled by one or more of the transmitting UEs 115. For example, the one or more transmitting UEs 115 may determine to trigger the CMRs 815 and the IMRs 820 based on CBR measurements, consecutive transmission failures, etc. In some implementations, the receiving UE 115 may then reconfigure a resource allocation to include the CMRs 815 and the IMRs 820 for all the transmitting UEs 115 based on a trigger received by the one or more transmitting UEs 115 or a reconfigured resource allocation may be recommended by the receiving UE 115.

Figure 9:
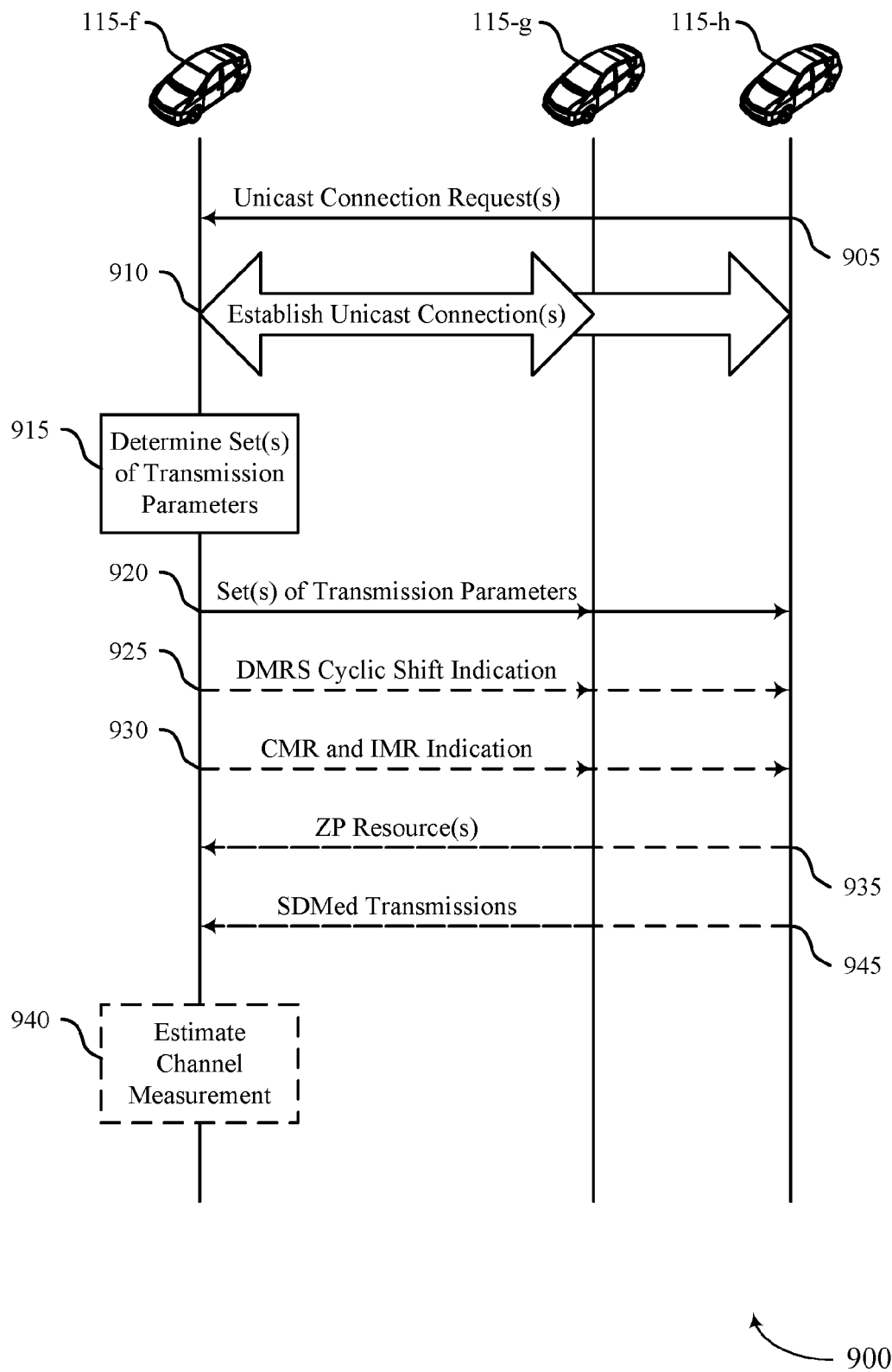
FIG. 9 illustrates an example of a process flow that supports unicast coordination for SDM communications in accordance with aspects of the present disclosure.

FIG. 9 illustrates an example of a process flow 900 that supports unicast coordination for SDM communications in accordance with aspects of the present disclosure. Process flow 900 may implement aspects of wireless communications systems 100 and 200. For example, process flow 900 may include a receiving UE 115-$f$ and one or more transmitting UEs 115, such as a transmitting UE 115-$g$ and a transmitting UE 115-$h$.

In the following description of the process flow 900, the operations between the receiving UE 115-$f$, the transmitting UE 115-$g$, and the transmitting UE 115-$h$ may be transmitted in a different order than the exemplary order shown, or the operations performed by the receiving UE 115-$f$, the transmitting UE 115-$g$, and the transmitting UE 115-$h$ may be performed in different orders or at different times. Certain operations may also be left out of the process flow 900, or other operations may be added to the process flow 900. It is to be understood that while the receiving UE 115-$f$, the transmitting UE 115-$g$, and the transmitting UE 115-$h$ are shown performing a number of the operations of process flow 900, any wireless device may perform the operations shown.

At 905, the transmitting UE 115-$g$ and the transmitting UE 115-$h$ may transmit, to the receiving UE 115-$f$, a request to establish a unicast connection (e.g., unicast connection requests) with a first TRP of multiple TRPs for the receiving UE 115-$f$.

At 910, the receiving UE 115-$f$ may establish a set of unicast connections with multiple transmitting UEs 115 including the transmitting UE 115-$g$ and the transmitting UE 115-$h$ (e.g., based on the request to establish the unicast connection), the multiple transmitting UEs 115 including one or more first transmitting UEs 115 connected to the first TRP of the receiving UE 115-$f$ via respective unicast connections of the set of unicast connections and one or more second transmitting UEs 115 connected to a second TRP of the receiving UE 115-$f$ via respective unicast connections of the set of unicast connections. In some implementations, the receiving UE 115-$f$ may select the multiple transmitting UEs 115 for establishing the set of unicast connections based on detecting an SCI message from each of the multiple transmitting UEs 115 (e.g., the unicast connection requests), performing a signal quality measurement among the first TRP and the second TRP of the receiving UE 115-$f$ for each transmitting UE 115, or a combination thereof.

At 915, the receiving UE 115-$f$ may determine a plurality of sets of transmission parameters for the multiple transmitting UEs 115, where the plurality of sets of transmission parameters may enable the receiving UE 115-$f$ to receive transmissions from the multiple transmitting UEs 115 on a same set of time and frequency resources via an SDM scheme. In some implementations, the receiving UE 115-$f$ may determine the plurality of sets of transmission parameters for the respective transmitting UEs of the multiple transmitting UEs based on which TRP of the receiving UE 115-$f$ is used for a respective unicast connection with a transmitting UE 115 of the multiple transmitting UEs. Additionally, a same set of transmission parameters may be used for a first transmitting UE 115 and for a second transmitting UE 115 of the multiple transmitting UEs 115 based on a first unicast connection being established between the first transmitting UE 115 and the receiving UE 115-$f$ via the first TRP and a second unicast connection being established between the second transmitting UE 115 and the receiving UE 115-$f$ via the second TRP.

In some implementations, the receiving UE 115-$f$ may determine the plurality of sets of transmission parameters based on one or more signal quality measurements of the set of unicast connections. For example, the one or more signal quality measurements may include an RSSI measurement, an RSRP measurement, biased information for each of the multiple transmitting UEs 115, or a combination thereof. Additionally, each set of transmission parameters may include a transmission schedule adjustment, a transmit power, a transmit time, an indication of the time and frequency resources, or a combination thereof.

At 920, the receiving UE 115-$f$ may transmit each set of transmission parameters from the plurality of sets of transmission parameters to respective transmitting UEs 115 of the multiple transmitting UEs 115. In some implementations, the receiving UE 115-$f$ may transmit each set of transmission parameters via an SCI message to the respective transmitting UEs 115. For example, each set of transmission parameters may be indicated via a resource bit map in the SCI message. Additionally, the SCI message may be a second stage SCI message.

At 925, the receiving UE 115-$f$ may transmit, to the respective transmitting UEs 115, an indication for a control DMRS cyclic shift for each transmitting UE 115 to use when transmitting communications to the receiving UE 115-$f$, where the control DMRS cyclic shift further enables the receiving UE 115-$f$ to receive the transmissions from the multiple transmitting UEs 115 on the same set of time and frequency resources via the SDM scheme. In some implementations, the receiving UE 115-$f$ may transmit the indication for the control DMRS cyclic shift to the respective transmitting UEs 115 via an SCI message. For example, the SCI message may be a second stage SCI message for UE coordination.

At 930, the receiving UE 115-$f$ may transmit, to the respective transmitting UEs 115, an indication of a CMR and an IMR. In some implementations, the receiving UE 115-$f$ may transmit the indication of the CMR and the IMR to each transmitting UE 115 via an SCI message. For example, the SCI message may be a second stage SCI message for UE coordination.

In some implementations, the receiving UE 115-$f$ may determine to transmit the indication of the CMR and the IMR based on a trigger. For example, the trigger may include a resource reservation information message decoded based on the SDM scheme, a CBR measurement, receiving an indication to trigger the CMR and the IMR from one or more transmitting UEs 115 from the multiple transmitting UEs 115, or a combination thereof. In some implementations, the CMR and the IMR may be part of a CSI-RS configuration. Additionally or alternatively, the CMR and the IMR may include control DMRS resources, data DMRS resources, even numbered data REs, even numbered control REs, or a combination thereof.

Additionally or alternatively, the transmitting UE 115-$g$ or the transmitting UE 115-$h$ may determine to transmit a trigger for the receiving UE 115-$f$ to transmit the indication of the CMR and the IMR. Subsequently, the transmitting UE 115-$g$ or the transmitting UE 115-$h$ may transmit, to the receiving UE 115-$f$, the trigger based on the determining. In some implementations, the transmitting UE 115-$g$ or the transmitting UE 115-$h$ may determine to transmit the trigger based on a CBR measurement, a number of consecutive transmission failures satisfying a threshold value, or a combination thereof.

At 935, the receiving UE 115-$f$ may receive one or more ZP resources from one or more transmitting UEs 115 of the multiple transmitting UEs 115 for the CMR, the IMR, or both.

At 940, the receiving UE 115-*f* may receive one or more SDMed transmissions from the multiple transmitting UEs 115 based on the plurality of sets of transmission parameters.

At 945, the receiving UE 115-*f* may estimate a channel measurement and an interference measurement per TRP for transmissions from the multiple transmitting UEs 115 on the same set of time and frequency resources based on the indication of the CMR and the IMR, where the transmissions from the multiple transmitting UEs 115 are received based on the estimating. In some implementations, the estimating of the interference measurement may be based on a measurement of the ZP resource(s)

Figure 10:
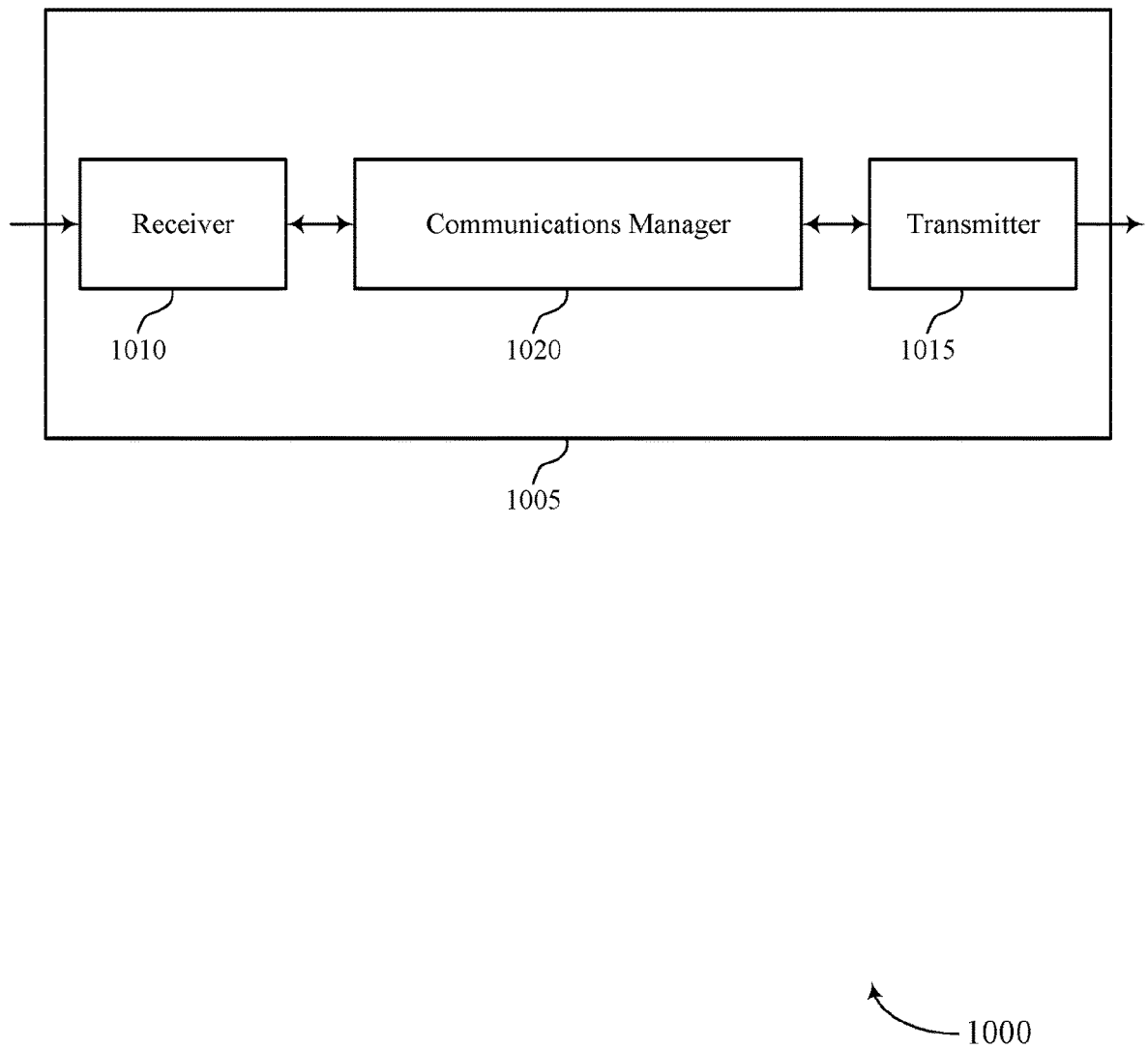
FIGS. 10 and 11 show block diagrams of devices that support unicast coordination for SDM communications in accordance with aspects of the present disclosure.

FIG. 10 shows a block diagram 1000 of a device 1005 that supports unicast coordination for SDM communications in accordance with aspects of the present disclosure. The device 1005 may be an example of aspects of a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to unicast coordination for SDM communications). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to size-based neural network selection for autoencoder-based communication). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of unicast coordination for SDM communications as described herein.

In some examples, the communications manager 1020, the receiver 1010, the transmitter 1015, or various combinations thereof or components thereof, may be implemented in hardware (e.g., in communications management circuitry). The circuitry may include a processor, a digital signal processor (DSP), an application-specific integrated circuit (ASIC), a field-programmable gate array (FPGA) or other programmable logic device, a discrete gate or transistor logic, discrete hardware components, or any combination thereof designed to perform the functions described in the present disclosure.

Additionally or alternatively, in some examples, the communications manager 1020, the receiver 1010, the transmitter 1015, or various combinations thereof or components thereof, may be implemented in code (e.g., as communications management software or firmware) executed by a processor. If implemented in code executed by a processor, the functions of the communications manager 1020, the receiver 1010, the transmitter 1015, or various combinations thereof or components thereof, may be executed by a general-purpose processor, a DSP, a central processing unit (CPU), an ASIC, an FPGA, or any combination of these or other programmable logic devices.

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a receiving UE in accordance with examples as disclosed herein. For example, the communications manager 1020 may be configured to provide or support a means for establishing a set of multiple unicast connections with a set of multiple transmitting UEs, the set of multiple transmitting UEs including one or more first transmitting UEs connected to a first transmission reception point of the receiving UE via respective unicast connections of the set of multiple unicast connections and one or more second transmitting UEs connected to a second transmission reception point of the receiving UE via respective unicast connections of the set of multiple unicast connections. The communications manager 1020 may be configured to provide or support a means for determining a set of multiple sets of transmission parameters for the set of multiple transmitting UEs, the set of multiple sets of transmission parameters enabling the receiving UE to receive transmissions from the set of multiple transmitting UEs on a same set of time and frequency resources via an SDM scheme. The communications manager 1020 may be configured to provide or support a means for transmitting each set of transmission parameters from the set of multiple sets of transmission parameters to respective transmitting UEs of the set of multiple transmitting UEs.

Additionally or alternatively, the communications manager 1020 may support wireless communications at a transmitting UE in accordance with examples as disclosed herein. For example, the communications manager 1020 may be configured to provide or support a means for transmitting, to a receiving UE, a request to establish a unicast connection with a first transmission reception point of multiple transmission reception points for the receiving UE. The communications manager 1020 may be configured to provide or support a means for receiving, from the receiving UE, a set of transmission parameters to use for subsequent communications on the unicast connection, the set of transmission parameters enabling the receiving UE to receive transmissions from a set of multiple transmitting UEs including the transmitting UE on a same set of time and frequency resources via an SDM scheme.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for more efficient utilization of communication resources (e.g., V2X resources) by receiving multiple transmissions from multiple UEs via an SDM scheme based on determined transmission parameters indicated to each of the multiple UEs.

Figure 11:
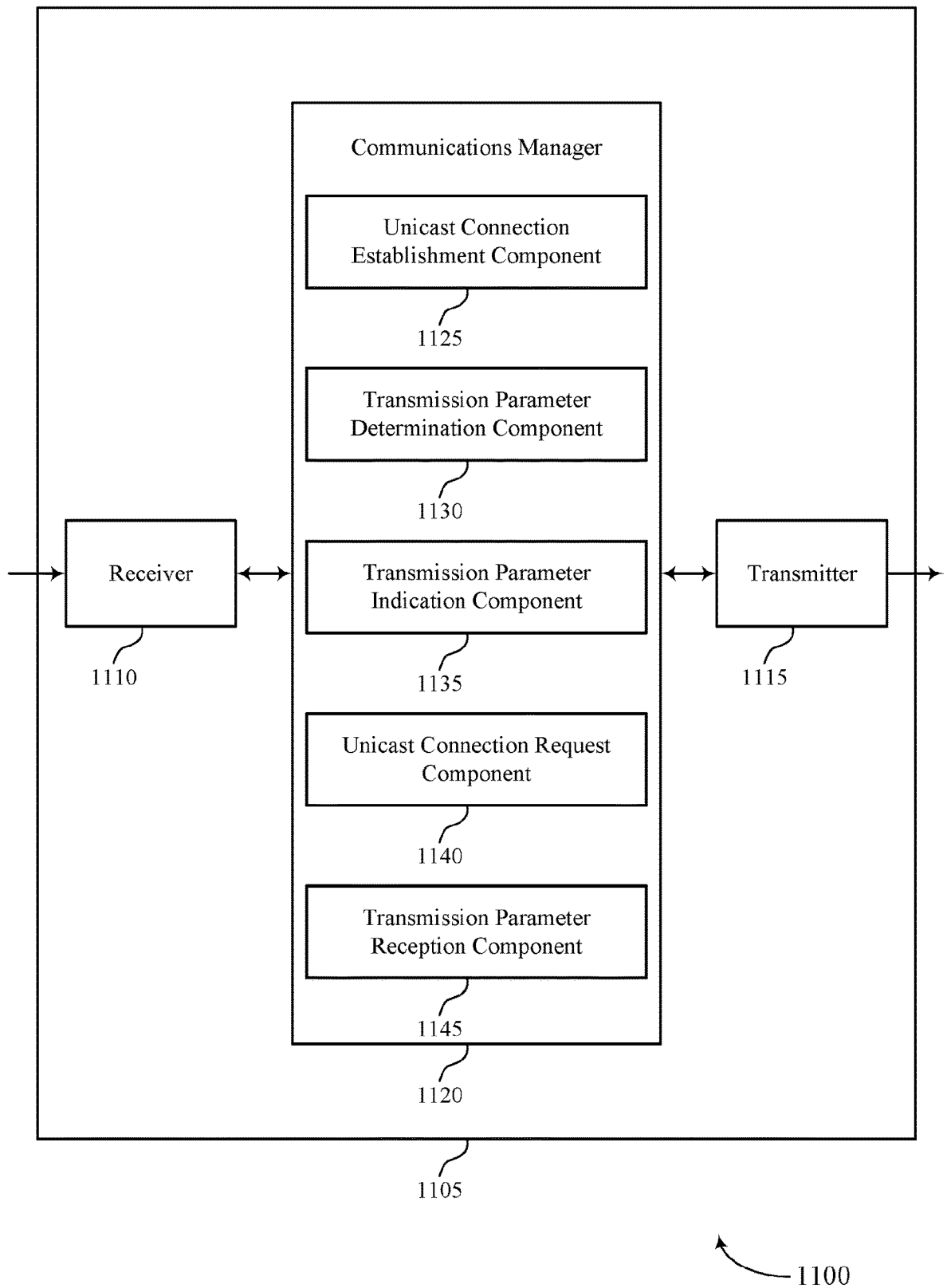

FIG. 11 shows a block diagram 1100 of a device 1105 that supports unicast coordination for SDM communications in accordance with aspects of the present disclosure. The device 1105 may be an example of aspects of a device 1005 or a UE 115 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to unicast coordination for SDM communications). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to size-based neural network selection for autoencoder-based communication). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of unicast coordination for SDM communications as described herein. For example, the communications manager 1120 may include a unicast connection establishment component 1125, a transmission parameter determination component 1130, a transmission parameter indication component 1135, a unicast connection request component 1140, a transmission parameter reception component 1145, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a receiving UE in accordance with examples as disclosed herein. The unicast connection establishment component 1125 may be configured to provide or support a means for establishing a set of multiple unicast connections with a set of multiple transmitting UEs, the set of multiple transmitting UEs including one or more first transmitting UEs connected to a first transmission reception point of the receiving UE via respective unicast connections of the set of multiple unicast connections and one or more second transmitting UEs connected to a second transmission reception point of the receiving UE via respective unicast connections of the set of multiple unicast connections. The transmission parameter determination component 1130 may be configured to provide or support a means for determining a set of multiple sets of transmission parameters for the set of multiple transmitting UEs, the set of multiple sets of transmission parameters enabling the receiving UE to receive transmissions from the set of multiple transmitting UEs on a same set of time and frequency resources via an SDM scheme. The transmission parameter indication component 1135 may be configured to provide or support a means for transmitting each set of transmission parameters from the set of multiple sets of transmission parameters to respective transmitting UEs of the set of multiple transmitting UEs.

Additionally or alternatively, the communications manager 1120 may support wireless communications at a transmitting UE in accordance with examples as disclosed herein. The unicast connection request component 1140 may be configured to provide or support a means for transmitting, to a receiving UE, a request to establish a unicast connection with a first transmission reception point of multiple transmission reception points for the receiving UE. The transmission parameter reception component 1145 may be configured to provide or support a means for receiving, from the receiving UE, a set of transmission parameters to use for subsequent communications on the unicast connection, the set of transmission parameters enabling the receiving UE to receive transmissions from a set of multiple transmitting UEs including the transmitting UE on a same set of time and frequency resources via an SDM scheme.

Figure 12:
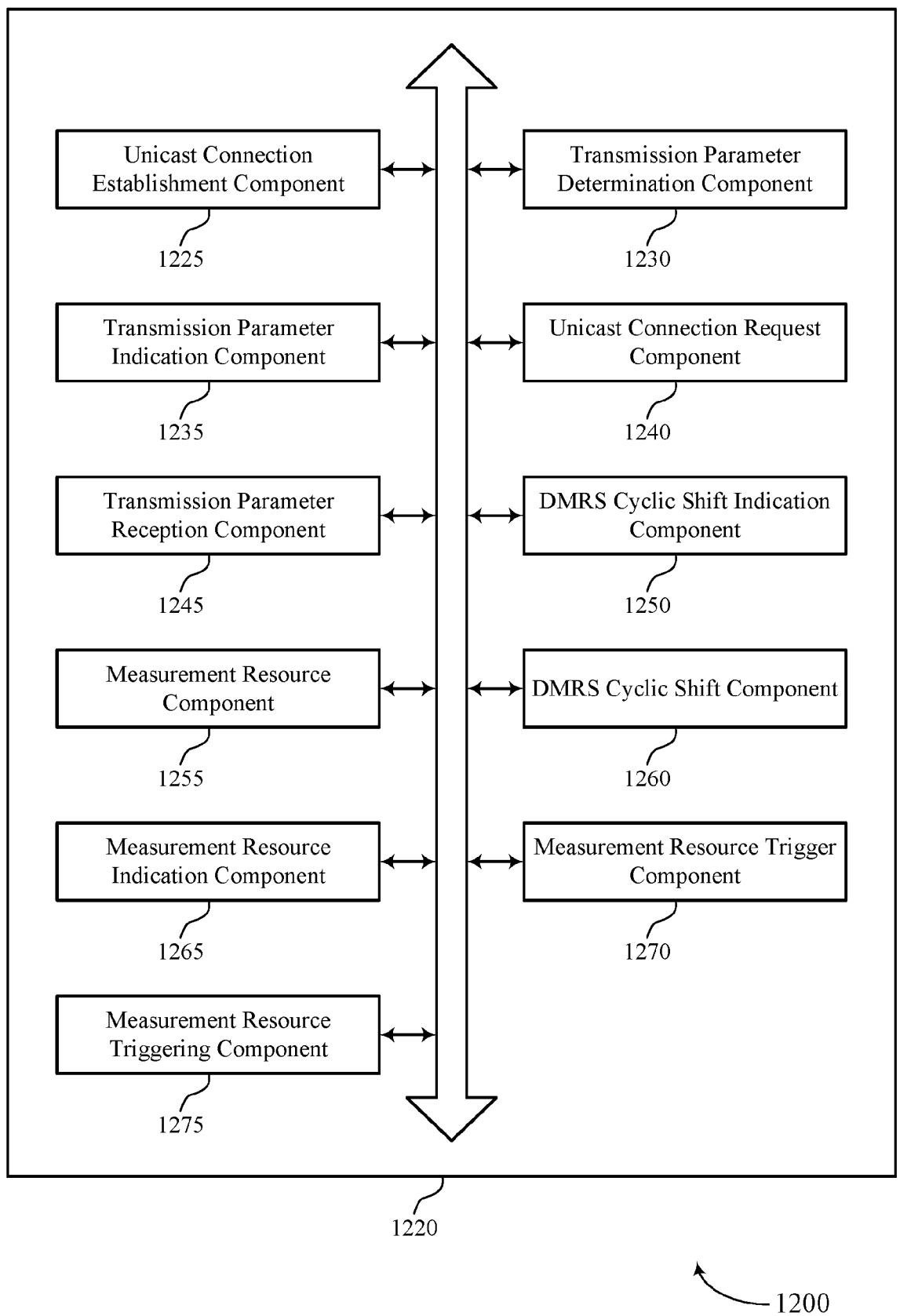
FIG. 12 shows a block diagram of a communications manager that supports unicast coordination for SDM communications in accordance with aspects of the present disclosure.

FIG. 12 shows a block diagram 1200 of a communications manager 1220 that supports unicast coordination for SDM communications in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of unicast coordination for SDM communications as described herein. For example, the communications manager 1220 may include a unicast connection establishment component 1225, a transmission parameter determination component 1230, a transmission parameter indication component 1235, a unicast connection request component 1240, a transmission parameter reception component 1245, a DMRS cyclic shift indication component 1250, a measurement resource component 1255, a DMRS cyclic shift component 1260, a measurement resource indication component 1265, a measurement resource trigger component 1270, a measurement resource triggering component 1275, or any combination thereof. Each of these components may communicate, directly or indirectly, with one another (e.g., via one or more buses).

The communications manager 1220 may support wireless communications at a receiving UE in accordance with examples as disclosed herein. The unicast connection establishment component 1225 may be configured to provide or support a means for establishing a set of multiple unicast connections with a set of multiple transmitting UEs, the set of multiple transmitting UEs including one or more first transmitting UEs connected to a first transmission reception point of the receiving UE via respective unicast connections of the set of multiple unicast connections and one or more second transmitting UEs connected to a second transmission reception point of the receiving UE via respective unicast connections of the set of multiple unicast connections. The transmission parameter determination component 1230 may be configured to provide or support a means for determining a set of multiple sets of transmission parameters for the set of multiple transmitting UEs, the set of multiple sets of transmission parameters enabling the receiving UE to receive transmissions from the set of multiple transmitting UEs on a same set of time and frequency resources via an SDM scheme. The transmission parameter indication component 1235 may be configured to provide or support a means for transmitting each set of transmission parameters from the set of multiple sets of transmission parameters to respective transmitting UEs of the set of multiple transmitting UEs.

In some examples, to support transmitting each set of transmission parameters to the respective transmitting UEs, the transmission parameter indication component 1235 may be configured to provide or support a means for transmitting each set of transmission parameters via a sidelink control information message to the respective transmitting UEs.

In some examples, each set of transmission parameters is indicated via a resource bit map in the sidelink control information message.

In some examples, the sidelink control information message includes a second stage sidelink control information message.

In some examples, the DMRS cyclic shift indication component 1250 may be configured to provide or support a means for transmitting, to the respective transmitting UEs, an indication for a control demodulation reference signal cyclic shift for each transmitting UE to use when transmitting communications to the receiving UE, where the control demodulation reference signal cyclic shift further enables the receiving UE to receive the transmissions from the set of multiple transmitting UEs on the same set of time and frequency resources via the SDM scheme.

In some examples, to support transmitting the indication for the control demodulation reference signal cyclic shift, the DMRS cyclic shift indication component 1250 may be configured to provide or support a means for transmitting the indication for the control demodulation reference signal cyclic shift to the respective transmitting UEs via a sidelink control information message.

In some examples, the sidelink control information message includes a second stage sidelink control information message for UE coordination.

In some examples, the measurement resource component 1255 may be configured to provide or support a means for transmitting, to the respective transmitting UEs, an indication of a channel measurement resource and an interference measurement resource. In some examples, the measurement resource component 1255 may be configured to provide or support a means for estimating a channel measurement and an interference measurement per transmission reception point for transmissions from the set of multiple transmitting UEs on the same set of time and frequency resources based on the indication of the channel measurement resource and the interference measurement resource, where the transmissions from the set of multiple transmitting UEs are received based on the estimating.

In some examples, to support transmitting the indication of the channel measurement resource and the interference measurement resource, the measurement resource indication component 1265 may be configured to provide or support a means for transmitting the indication of the channel measurement resource and the interference measurement resource to each transmitting UE via a sidelink control information message.

In some examples, the sidelink control information message includes a second stage sidelink control information message for UE coordination.

In some examples, the measurement resource component 1255 may be configured to provide or support a means for receiving a zero power resource from one or more transmitting UEs of the set of multiple transmitting UEs for the channel measurement resource, the interference measurement resource, or both, where the estimating the interference measurement is based on a measurement of the zero power resource.

In some examples, the measurement resource trigger component 1270 may be configured to provide or support a means for determining to transmit the indication of the channel measurement resource and the interference measurement resource based on a trigger.

In some examples, the trigger includes a resource reservation information message decoded based on the SDM scheme, a channel busy ratio measurement, receiving an indication to trigger the channel measurement resource and the interference measurement resource from one or more transmitting UEs from the set of multiple transmitting UEs, or a combination thereof.

In some examples, the channel measurement resource and the interference measurement resource are part of a channel state information reference signal configuration.

In some examples, the channel measurement resource and the interference measurement resource include control demodulation reference signal resources, data demodulation reference signal resources, even numbered data resource elements, even numbered control resource elements, or a combination thereof.

In some examples, the unicast connection establishment component 1225 may be configured to provide or support a means for selecting the set of multiple transmitting UEs for establishing the set of multiple unicast connections based on detecting a sidelink control information message from each of the set of multiple transmitting UEs, performing a signal quality measurement among the first transmission reception point and the second transmission reception point of the receiving UE for each transmitting UE, or a combination thereof.

In some examples, to support determining the set of multiple sets of transmission parameters, the transmission parameter determination component 1230 may be configured to provide or support a means for determining the set of multiple sets of transmission parameters for the respective transmitting UEs of the set of multiple transmitting UEs based on which transmission reception point of the receiving UE is used for a respective unicast connection with a transmitting UE of the set of multiple transmitting UEs.

In some examples, a same set of transmission parameters is used for a first transmitting UE and for a second transmitting UE of the set of multiple transmitting UEs based on the a first unicast connection being established between the first transmitting UE and the receiving UE via the first transmission reception point and a second unicast connection being established between the second transmitting UE and the receiving UE via the second transmission reception point.

In some examples, to support determining the set of multiple sets of transmission parameters, the transmission parameter determination component 1230 may be configured to provide or support a means for determining the set of multiple sets of transmission parameters based on one or more signal quality measurements of the set of multiple unicast connections.

In some examples, the one or more signal quality measurements include a reference signal strength indicator measurement, a reference signal received power measurement, biased information for each of the set of multiple transmitting UEs, or a combination thereof.

In some examples, each set of transmission parameters includes a transmission schedule adjustment, a transmit power, a transmit time, an indication of the time and frequency resources, or a combination thereof.

Additionally or alternatively, the communications manager 1220 may support wireless communications at a transmitting UE in accordance with examples as disclosed herein. The unicast connection request component 1240 may be configured to provide or support a means for transmitting, to a receiving UE, a request to establish a unicast connection with a first transmission reception point of multiple transmission reception points for the receiving UE. The transmission parameter reception component 1245 may be configured to provide or support a means for receiving, from the receiving UE, a set of transmission parameters to use for subsequent communications on the unicast connection, the set of transmission parameters enabling the receiving UE to receive transmissions from a set of multiple transmitting UEs including the transmitting UE on a same set of time and frequency resources via an SDM scheme.

In some examples, to support receiving the set of transmission parameters, the transmission parameter reception component 1245 may be configured to provide or support a means for receiving, from the receiving UE, the set of transmission parameters via a sidelink control information message.

In some examples, the set of transmission parameters is indicated via a resource bit map in the sidelink control information message.

In some examples, the sidelink control information message includes a second stage sidelink control information message.

In some examples, the DMRS cyclic shift component 1260 may be configured to provide or support a means for receiving, from the receiving UE, an indication for a control demodulation reference signal cyclic shift to use for the subsequent communications, where the control demodulation reference signal cyclic shift further enables the receiving UE to receive the transmissions from the set of multiple transmitting UEs on the same set of time and frequency resources via the SDM scheme.

In some examples, to support receiving the indication for the control demodulation reference signal cyclic shift, the DMRS cyclic shift component 1260 may be configured to provide or support a means for receiving, from the receiving UE, the indication for the control demodulation reference signal cyclic shift via a sidelink control information message.

In some examples, the sidelink control information message includes a second stage sidelink control information message for UE coordination.

In some examples, the measurement resource component 1255 may be configured to provide or support a means for receiving, from the receiving UE, an indication of a channel measurement resource and an interference measurement resource for the subsequent communications.

In some examples, to support receiving the indication of the channel measurement resource and the interference measurement resource, the measurement resource component 1255 may be configured to provide or support a means for receiving, from the receiving UE, the indication of the channel measurement resource and the interference measurement resource via a sidelink control information message.

In some examples, the sidelink control information message includes a second stage sidelink control information message for UE coordination.

In some examples, the measurement resource component 1255 may be configured to provide or support a means for transmitting, to the receiving UE, a zero power resource using the channel measurement resource, the interference measurement resource, or both.

In some examples, the measurement resource triggering component 1275 may be configured to provide or support a means for determining to transmit a trigger for the receiving UE to transmit the indication of the channel measurement resource and the interference measurement resource.

In some examples, to support determining to transmit the trigger, the measurement resource triggering component 1275 may be configured to provide or support a means for determining to transmit the trigger based on a channel busy ratio measurement, a number of consecutive transmission failures satisfying a threshold value, or a combination thereof.

In some examples, the channel measurement resource and the interference measurement resource are part of a channel state information reference signal configuration.

In some examples, the channel measurement resource and the interference measurement resource include control demodulation reference signal resources, data demodulation reference signal resources, even numbered data resource elements, even numbered control resource elements, or a combination thereof.

In some examples, the set of transmission parameters includes a transmission schedule adjustment, a transmit power, a transmit time, an indication of the time and frequency resources, or a combination thereof.

Figure 13:
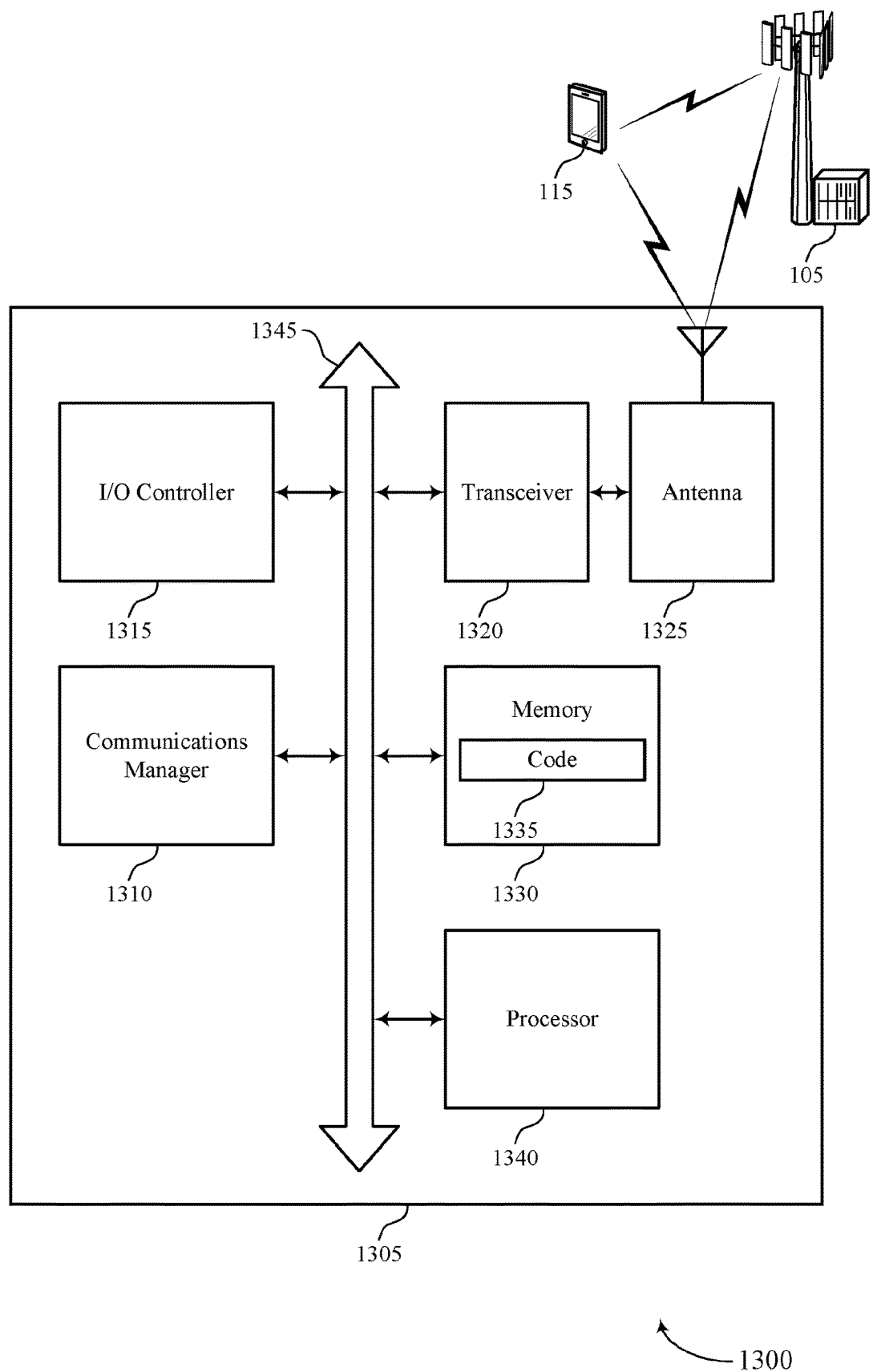
FIG. 13 shows a diagram of a system including a device that supports unicast coordination for SDM communications in accordance with aspects of the present disclosure.

FIG. 13 shows a diagram of a system 1300 including a device 1305 that supports unicast coordination for SDM communications in accordance with aspects of the present disclosure. The device 1305 may be an example of or include the components of a device 1005, a device 1105, or a UE 115 as described herein. The device 1305 may communicate wirelessly with one or more base stations 105, UEs 115, or any combination thereof. The device 1305 may include components for bi-directional voice and data communications including components for transmitting and receiving communications, including a communications manager 1310, an I/O controller 1315, a transceiver 1320, an antenna 1325, a memory 1330, code 1335, and a processor 1340. These components may be in electronic communication or otherwise coupled (e.g., operatively, communicatively, functionally, electronically, electrically) via one or more buses (e.g., a bus 1345).

The I/O controller 1315 may manage input and output signals for the device 1305. The I/O controller 1315 may also manage peripherals not integrated into the device 1305. In some cases, the I/O controller 1315 may represent a physical connection or port to an external peripheral. In some cases, the I/O controller 1315 may utilize an operating system such as iOS®, ANDROID®, MS-DOS®, MS-WINDOWS®, OS/2®, UNIX®, LINUX®, or another known operating system. In some other cases, the I/O controller 1315 may represent or interact with a modem, a keyboard, a mouse, a touchscreen, or a similar device. In some cases, the I/O controller 1315 may be implemented as part of a processor, such as the processor 1340. In some cases, a user may interact with the device 1305 via the I/O controller 1315 or via hardware components controlled by the I/O controller 1315.

In some cases, the device 1305 may include a single antenna 1325. However, in some other cases the device 1305 may have more than one antenna 1325, which may be capable of concurrently transmitting or receiving multiple wireless transmissions. The transceiver 1320 may communicate bi-directionally, via the one or more antennas 1325, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to one or more antennas 1325 for transmission, and to demodulate packets received from the one or more antennas 1325. The transceiver 1320, or the transceiver 1320 and one or more antennas 1325, may be an example of a transmitter 1015, a transmitter 1115, a receiver 1010, a receiver 1110, or any combination thereof or component thereof, as described herein.

The memory 1330 may include random access memory (RAM) and read-only memory (ROM). The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein. In some cases, the memory 1330 may contain, among other things, a basic I/O system (BIOS) which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting unicast coordination for SDM communications). For example, the device 1305 or a component of the device 1305 may include a processor 1340 and memory 1330 coupled to the processor 1340, the processor 1340 and memory 1330 configured to perform various functions described herein.

The communications manager 1310 may support wireless communications at a receiving UE in accordance with examples as disclosed herein. For example, the communications manager 1310 may be configured to provide or support a means for establishing a set of multiple unicast connections with a set of multiple transmitting UEs, the set of multiple transmitting UEs including one or more first transmitting UEs connected to a first transmission reception point of the receiving UE via respective unicast connections of the set of multiple unicast connections and one or more second transmitting UEs connected to a second transmission reception point of the receiving UE via respective unicast connections of the set of multiple unicast connections. The communications manager 1310 may be configured to provide or support a means for determining a set of multiple sets of transmission parameters for the set of multiple transmitting UEs, the set of multiple sets of transmission parameters enabling the receiving UE to receive transmissions from the set of multiple transmitting UEs on a same set of time and frequency resources via an SDM scheme. The communications manager 1310 may be configured to provide or support a means for transmitting each set of transmission parameters from the set of multiple sets of transmission parameters to respective transmitting UEs of the set of multiple transmitting UEs.

Additionally or alternatively, the communications manager 1310 may support wireless communications at a transmitting UE in accordance with examples as disclosed herein. For example, the communications manager 1310 may be configured to provide or support a means for transmitting, to a receiving UE, a request to establish a unicast connection with a first transmission reception point of multiple transmission reception points for the receiving UE. The communications manager 1310 may be configured to provide or support a means for receiving, from the receiving UE, a set of transmission parameters to use for subsequent communications on the unicast connection, the set of transmission parameters enabling the receiving UE to receive transmissions from a set of multiple transmitting UEs including the transmitting UE on a same set of time and frequency resources via an SDM scheme.

By including or configuring the communications manager 1310 in accordance with examples as described herein, the device 1305 may support techniques for improved communication reliability, more efficient utilization of communication resources, and improved coordination between devices. For example, the determined sets of transmission parameters may enable multiple transmitting UEs to use a same set of time and frequency resources (e.g., more efficient use of communication resources) when transmitting messages to the receiving UE, where the receiving UE receives the messages according to an SDM scheme based on the sets of transmission parameters. Additionally, the determined sets of transmission parameters may decrease chances that the messages interfere with each other, thereby improving reliability.

In some examples, the communications manager 1310 may be configured to perform various operations (e.g., receiving, monitoring, transmitting) using or otherwise in cooperation with the transceiver 1320, the one or more antennas 1325, or any combination thereof. Although the communications manager 1310 is illustrated as a separate component, in some examples, one or more functions described with reference to the communications manager 1310 may be supported by or performed by the processor 1340, the memory 1330, the code 1335, or any combination thereof. For example, the code 1335 may include instructions executable by the processor 1340 to cause the device 1305 to perform various aspects of unicast coordination for SDM communications as described herein, or the processor 1340 and the memory 1330 may be otherwise configured to perform or support such operations.

Figure 14:
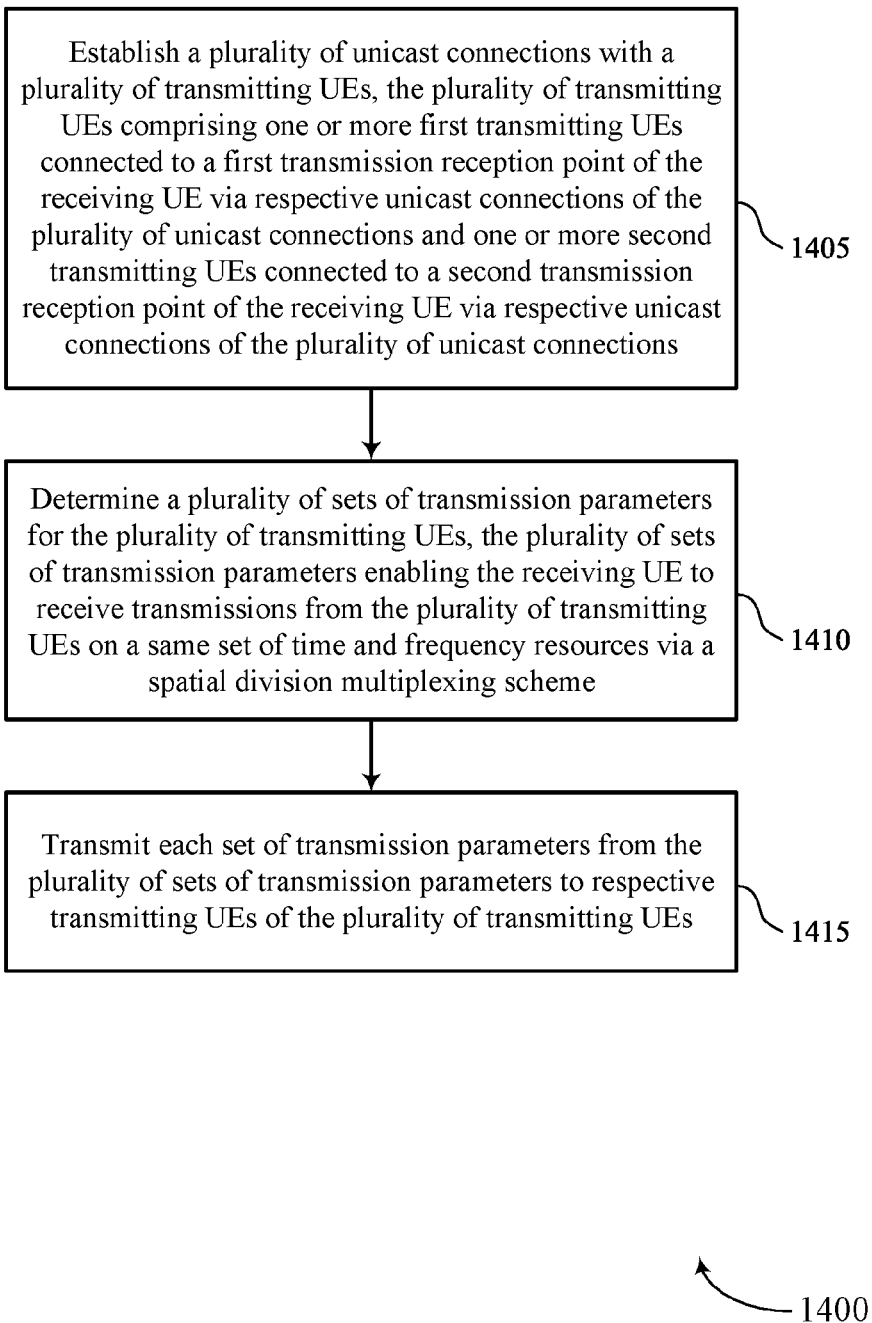
FIGS. 14 through 19 show flowcharts illustrating methods that support unicast coordination for SDM communications in accordance with aspects of the present disclosure.

FIG. 14 shows a flowchart illustrating a method 1400 that supports unicast coordination for SDM communications in accordance with aspects of the present disclosure. The operations of the method 1400 may be implemented by a receiving UE or its components as described herein. For example, the operations of the method 1400 may be performed by a receiving UE 115 as described with reference to FIGS. 1 through 13. In some examples, a UE may execute a set of instructions to control the functional elements of the UE to perform the described functions. Additionally or alternatively, the UE may perform aspects of the described functions using special-purpose hardware.

At 1405, the method may include establishing a set of multiple unicast connections with a set of multiple transmitting UEs, the set of multiple transmitting UEs including one or more first transmitting UEs connected to a first transmission reception point of the receiving UE via respective unicast connections of the set of multiple unicast connections and one or more second transmitting UEs connected to a second transmission reception point of the receiving UE via respective unicast connections of the set of multiple unicast connections. The operations of 1405 may be performed according to the methods described herein. In some examples, aspects of the operations of 1405 may be performed by a unicast connection establishment component 1225 as described with reference to FIG. 12.

At 1410, the method may include determining a set of multiple sets of transmission parameters for the set of multiple transmitting UEs, the set of multiple sets of transmission parameters enabling the receiving UE to receive transmissions from the set of multiple transmitting UEs on a same set of time and frequency resources via an SDM scheme. The operations of 1410 may be performed according to the methods described herein. In some examples, aspects of the operations of 1410 may be performed by a transmission parameter determination component 1230 as described with reference to FIG. 12.

At 1415, the method may include transmitting each set of transmission parameters from the set of multiple sets of transmission parameters to respective transmitting UEs of the set of multiple transmitting UEs. The operations of 1415 may be performed according to the methods described herein. In some examples, aspects of the operations of 1415 may be performed by a transmission parameter indication component 1235 as described with reference to FIG. 12.

Figure 15:
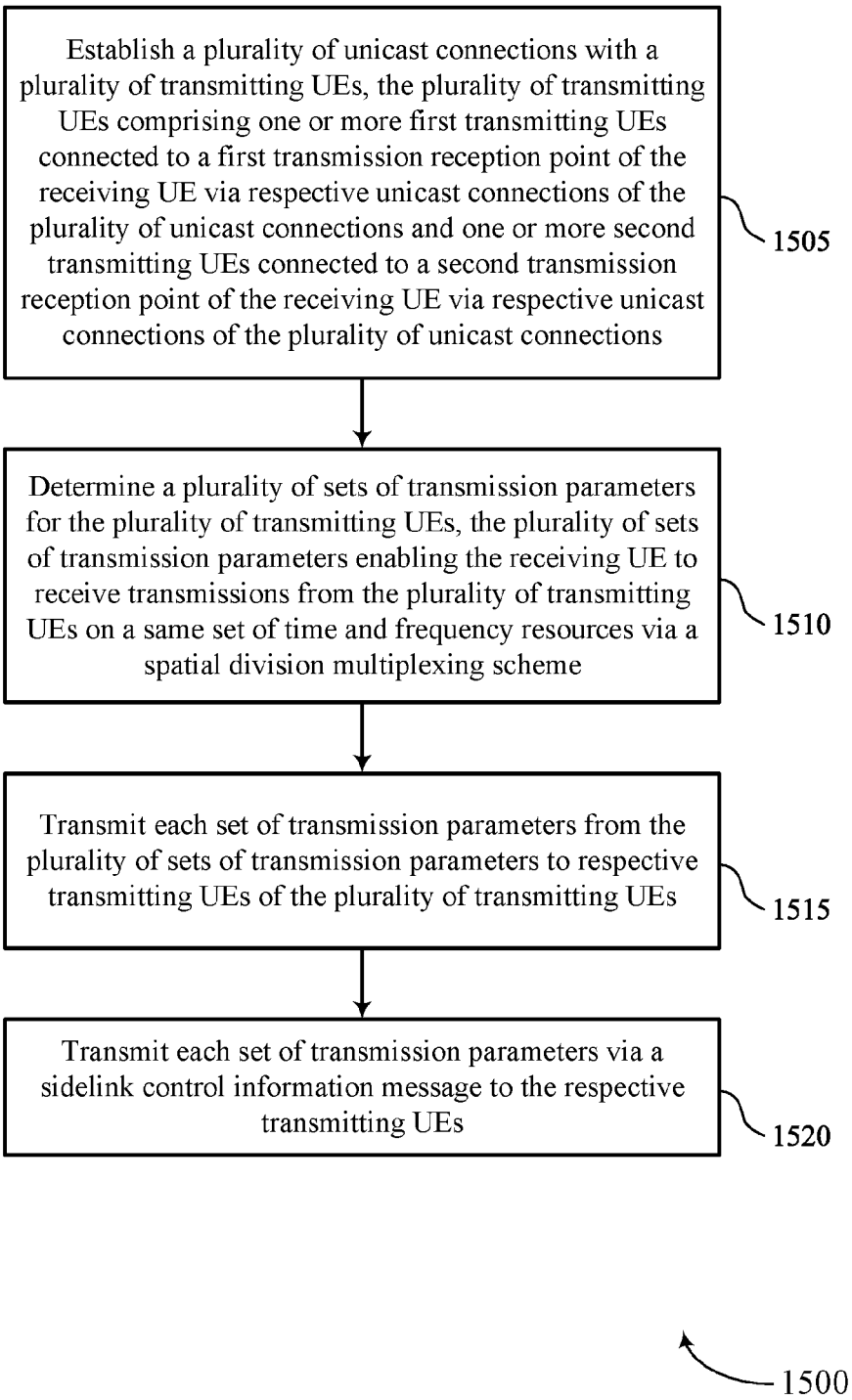

FIG. 15 shows a flowchart illustrating a method 1500 that supports unicast coordination for SDM communications in accordance with aspects of the present disclosure. The operations of the method 1500 may be implemented by a receiving UE or its components as described herein. For example, the operations of the method 1500 may be performed by a receiving UE 115 as described with reference to FIGS. 1 through 13. In some examples, a UE may execute a set of instructions to control the functional elements of the UE to perform the described functions. Additionally or alternatively, the UE may perform aspects of the described functions using special-purpose hardware.

At 1505, the method may include establishing a set of multiple unicast connections with a set of multiple transmitting UEs, the set of multiple transmitting UEs including one or more first transmitting UEs connected to a first transmission reception point of the receiving UE via respective unicast connections of the set of multiple unicast connections and one or more second transmitting UEs connected to a second transmission reception point of the receiving UE via respective unicast connections of the set of multiple unicast connections. The operations of 1505 may be performed according to the methods described herein. In some examples, aspects of the operations of 1505 may be performed by a unicast connection establishment component 1225 as described with reference to FIG. 12.

At 1510, the method may include determining a set of multiple sets of transmission parameters for the set of multiple transmitting UEs, the set of multiple sets of transmission parameters enabling the receiving UE to receive transmissions from the set of multiple transmitting UEs on a same set of time and frequency resources via an SDM scheme. The operations of 1510 may be performed according to the methods described herein. In some examples, aspects of the operations of 1510 may be performed by a transmission parameter determination component 1230 as described with reference to FIG. 12.

At 1515, the method may include transmitting each set of transmission parameters from the set of multiple sets of transmission parameters to respective transmitting UEs of the set of multiple transmitting UEs. The operations of 1515 may be performed according to the methods described herein. In some examples, aspects of the operations of 1515 may be performed by a transmission parameter indication component 1235 as described with reference to FIG. 12.

At 1520, the method may include transmitting each set of transmission parameters via a sidelink control information message to the respective transmitting UEs. The operations of 1520 may be performed according to the methods described herein. In some examples, aspects of the operations of 1520 may be performed by a transmission parameter indication component 1235 as described with reference to FIG. 12.

Figure 16:
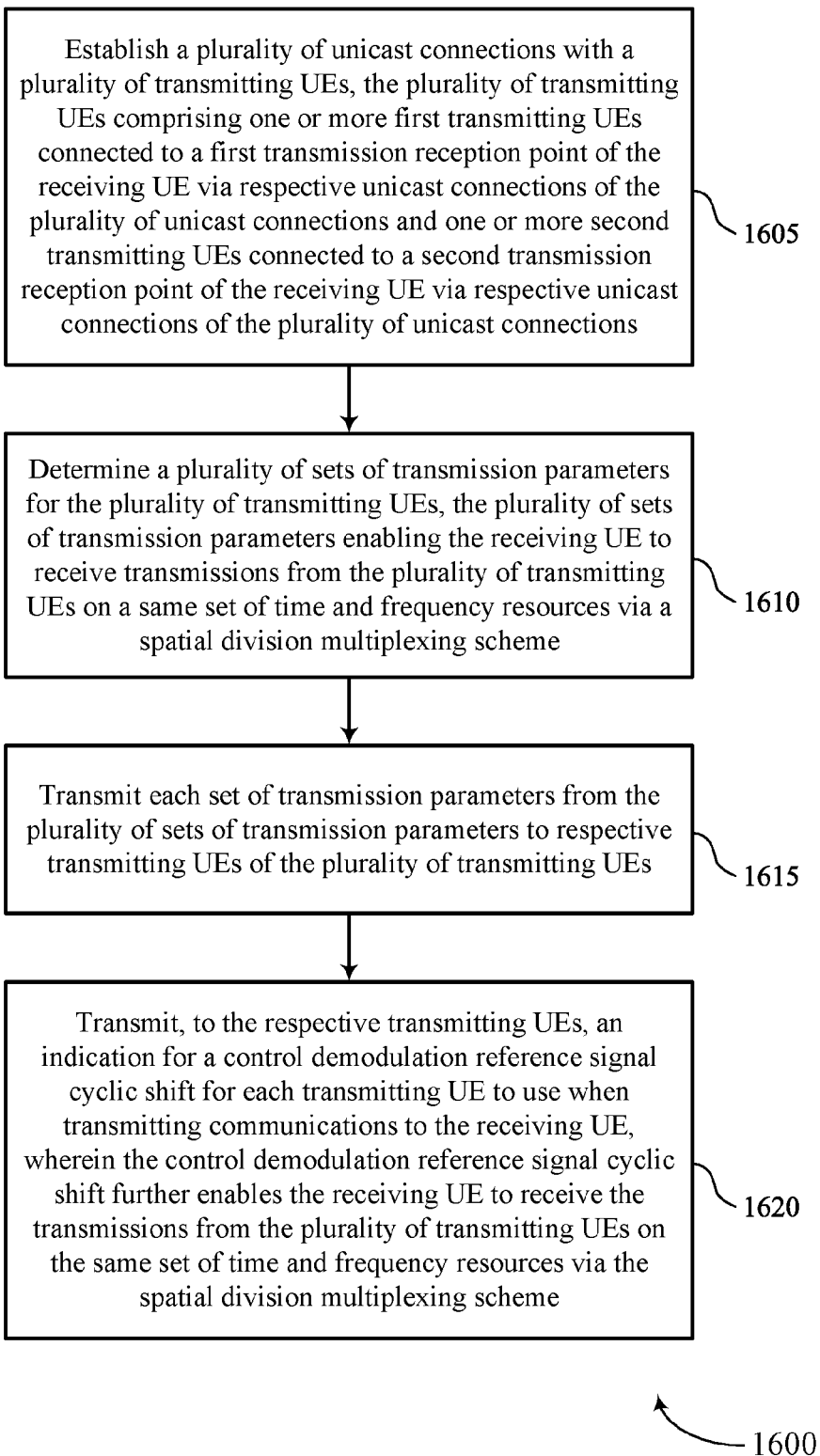

FIG. 16 shows a flowchart illustrating a method 1600 that supports unicast coordination for SDM communications in accordance with aspects of the present disclosure. The operations of the method 1600 may be implemented by a receiving UE or its components as described herein. For example, the operations of the method 1600 may be performed by a receiving UE 115 as described with reference to FIGS. 1 through 13. In some examples, a UE may execute a set of instructions to control the functional elements of the UE to perform the described functions. Additionally or alternatively, the UE may perform aspects of the described functions using special-purpose hardware.

At 1605, the method may include establishing a set of multiple unicast connections with a set of multiple transmitting UEs, the set of multiple transmitting UEs including one or more first transmitting UEs connected to a first transmission reception point of the receiving UE via respective unicast connections of the set of multiple unicast connections and one or more second transmitting UEs connected to a second transmission reception point of the receiving UE via respective unicast connections of the set of multiple unicast connections. The operations of 1605 may be performed according to the methods described herein. In some examples, aspects of the operations of 1605 may be performed by a unicast connection establishment component 1225 as described with reference to FIG. 12.

At 1610, the method may include determining a set of multiple sets of transmission parameters for the set of multiple transmitting UEs, the set of multiple sets of transmission parameters enabling the receiving UE to receive transmissions from the set of multiple transmitting UEs on a same set of time and frequency resources via an SDM scheme. The operations of 1610 may be performed according to the methods described herein. In some examples, aspects of the operations of 1610 may be performed by a transmission parameter determination component 1230 as described with reference to FIG. 12.

At 1615, the method may include transmitting each set of transmission parameters from the set of multiple sets of transmission parameters to respective transmitting UEs of the set of multiple transmitting UEs. The operations of 1615 may be performed according to the methods described herein. In some examples, aspects of the operations of 1615 may be performed by a transmission parameter indication component 1235 as described with reference to FIG. 12.

At 1620, the method may include transmitting, to the respective transmitting UEs, an indication for a control demodulation reference signal cyclic shift for each transmitting UE to use when transmitting communications to the receiving UE, where the control demodulation reference signal cyclic shift further enables the receiving UE to receive the transmissions from the set of multiple transmitting UEs on the same set of time and frequency resources via the SDM scheme. The operations of 1620 may be performed according to the methods described herein. In some examples, aspects of the operations of 1620 may be performed by an DMRS cyclic shift indication component 1250 as described with reference to FIG. 12.

Figure 17:
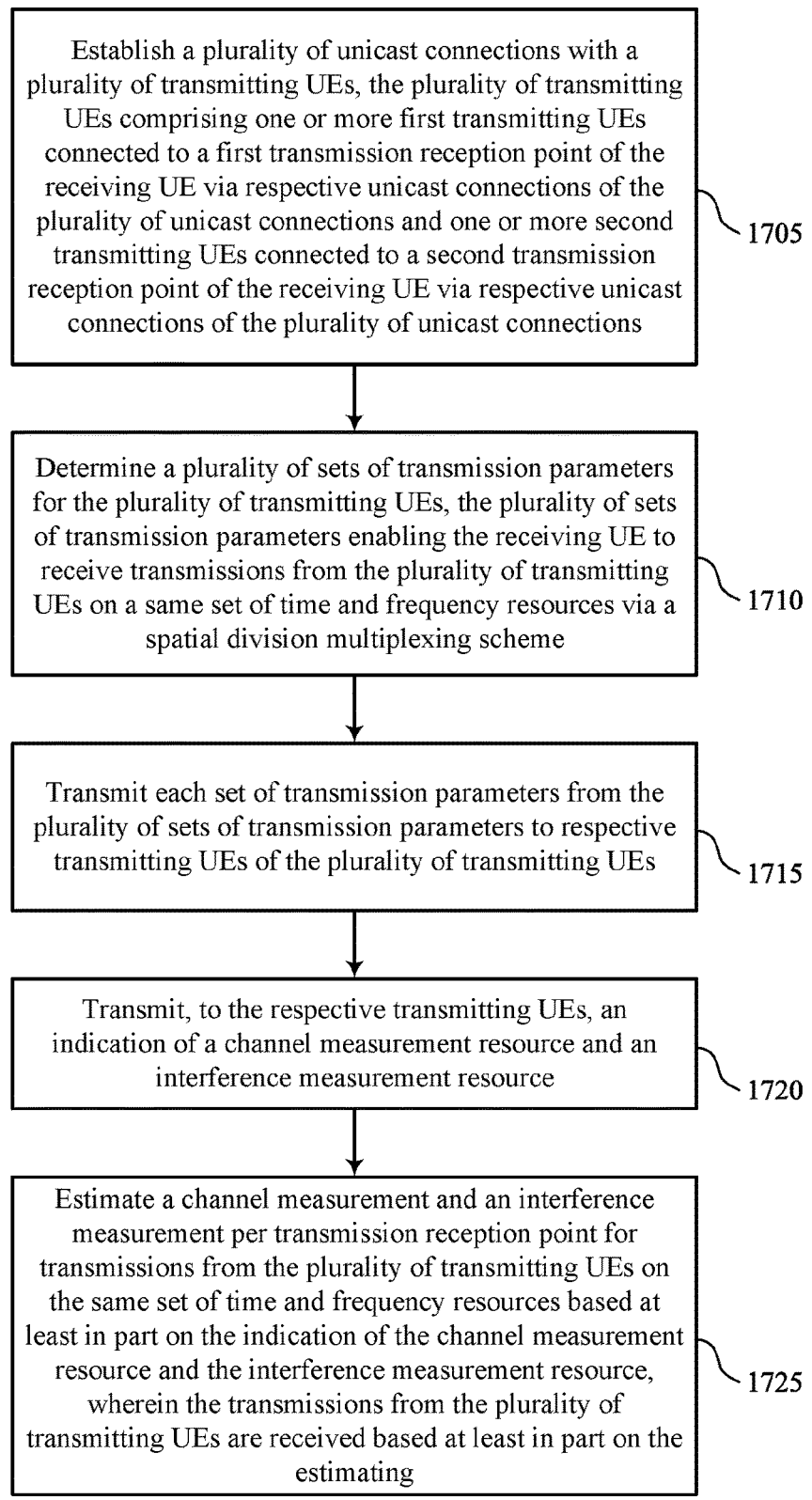

FIG. 17 shows a flowchart illustrating a method 1700 that supports unicast coordination for SDM communications in accordance with aspects of the present disclosure. The operations of the method 1700 may be implemented by a receiving UE or its components as described herein. For example, the operations of the method 1700 may be performed by a receiving UE 115 as described with reference to FIGS. 1 through 13. In some examples, a UE may execute a set of instructions to control the functional elements of the UE to perform the described functions. Additionally or alternatively, the UE may perform aspects of the described functions using special-purpose hardware.

At 1705, the method may include establishing a set of multiple unicast connections with a set of multiple transmitting UEs, the set of multiple transmitting UEs including one or more first transmitting UEs connected to a first transmission reception point of the receiving UE via respective unicast connections of the set of multiple unicast connections and one or more second transmitting UEs connected to a second transmission reception point of the receiving UE via respective unicast connections of the set of multiple unicast connections. The operations of 1705 may be performed according to the methods described herein. In some examples, aspects of the operations of 1705 may be performed by a unicast connection establishment component 1225 as described with reference to FIG. 12.

At 1710, the method may include determining a set of multiple sets of transmission parameters for the set of multiple transmitting UEs, the set of multiple sets of transmission parameters enabling the receiving UE to receive transmissions from the set of multiple transmitting UEs on a same set of time and frequency resources via an SDM scheme. The operations of 1710 may be performed according to the methods described herein. In some examples, aspects of the operations of 1710 may be performed by a transmission parameter determination component 1230 as described with reference to FIG. 12.

At 1715, the method may include transmitting each set of transmission parameters from the set of multiple sets of transmission parameters to respective transmitting UEs of the set of multiple transmitting UEs. The operations of 1715 may be performed according to the methods described herein. In some examples, aspects of the operations of 1715 may be performed by a transmission parameter indication component 1235 as described with reference to FIG. 12.

At 1720, the method may include transmitting, to the respective transmitting UEs, an indication of a channel measurement resource and an interference measurement resource. The operations of 1720 may be performed according to the methods described herein. In some examples, aspects of the operations of 1720 may be performed by a measurement resource component 1255 as described with reference to FIG. 12.

At 1725, the method may include estimating a channel measurement and an interference measurement per transmission reception point for transmissions from the set of multiple transmitting UEs on the same set of time and frequency resources based on the indication of the channel measurement resource and the interference measurement resource, where the transmissions from the set of multiple transmitting UEs are received based on the estimating. The operations of 1725 may be performed according to the methods described herein. In some examples, aspects of the operations of 1725 may be performed by a measurement resource component 1255 as described with reference to FIG. 12.

Figure 18:
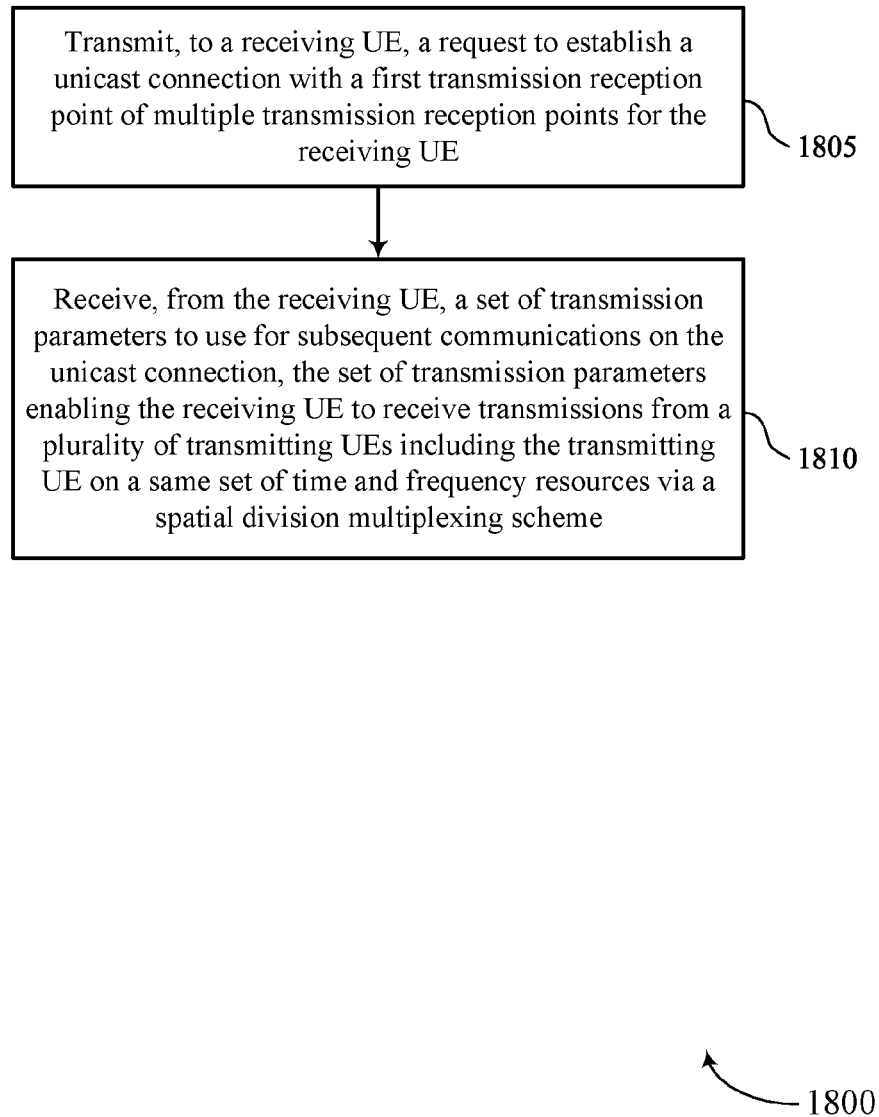

FIG. 18 shows a flowchart illustrating a method 1800 that supports unicast coordination for SDM communications in accordance with aspects of the present disclosure. The operations of the method 1800 may be implemented by a transmitting UE or its components as described herein. For example, the operations of the method 1800 may be performed by a transmitting UE 115 as described with reference to FIGS. 1 through 13. In some examples, a UE may execute a set of instructions to control the functional elements of the UE to perform the described functions. Additionally or alternatively, the UE may perform aspects of the described functions using special-purpose hardware.

At 1805, the method may include transmitting, to a receiving UE, a request to establish a unicast connection with a first transmission reception point of multiple transmission reception points for the receiving UE. The operations of 1805 may be performed according to the methods described herein. In some examples, aspects of the operations of 1805 may be performed by a unicast connection request component 1240 as described with reference to FIG. 12.

At 1810, the method may include receiving, from the receiving UE, a set of transmission parameters to use for subsequent communications on the unicast connection, the set of transmission parameters enabling the receiving UE to receive transmissions from a set of multiple transmitting UEs including the transmitting UE on a same set of time and frequency resources via an SDM scheme. The operations of 1810 may be performed according to the methods described herein. In some examples, aspects of the operations of 1810 may be performed by a transmission parameter reception component 1245 as described with reference to FIG. 12.

Figure 19:
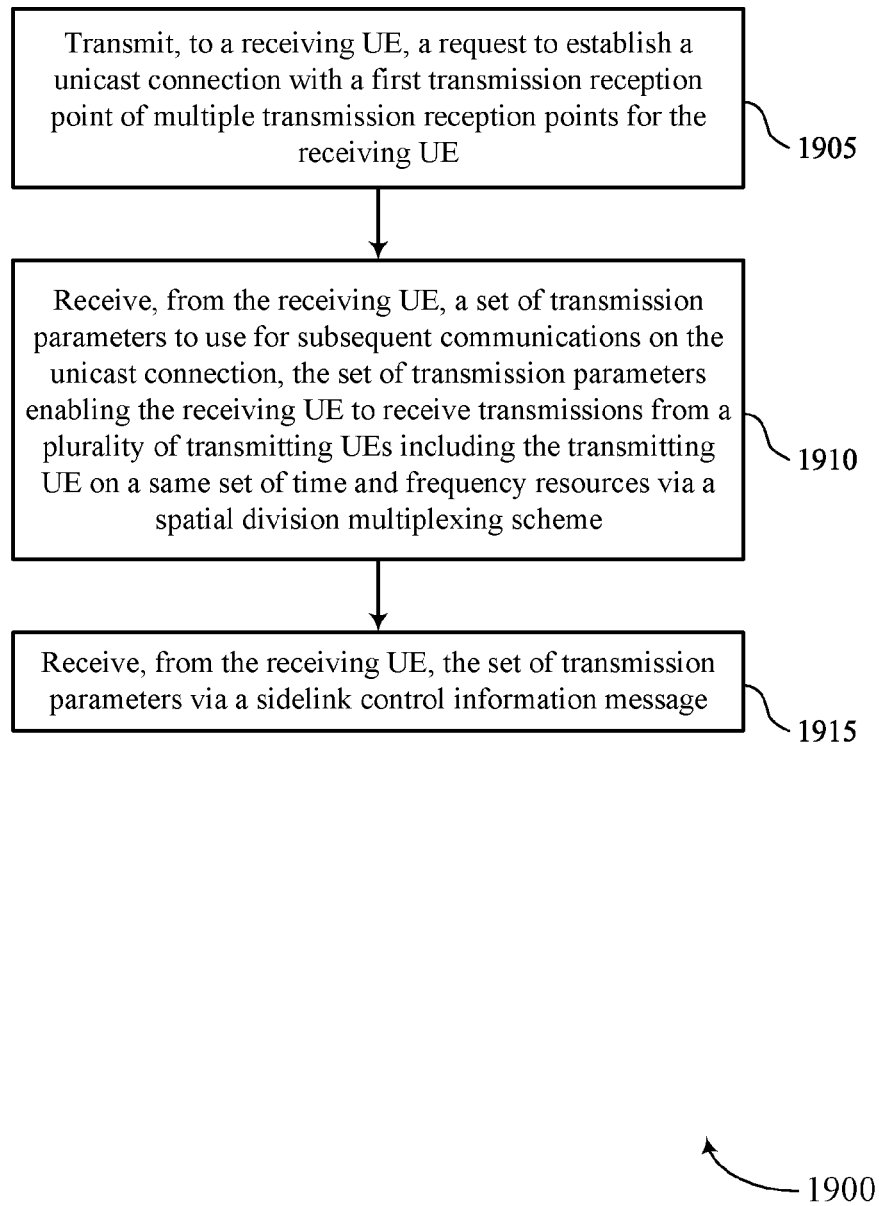

FIG. 19 shows a flowchart illustrating a method 1900 that supports unicast coordination for SDM communications in accordance with aspects of the present disclosure. The operations of the method 1900 may be implemented by a transmitting UE or its components as described herein. For example, the operations of the method 1900 may be performed by a transmitting UE 115 as described with reference to FIGS. 1 through 13. In some examples, a UE may execute a set of instructions to control the functional elements of the UE to perform the described functions. Additionally or alternatively, the UE may perform aspects of the described functions using special-purpose hardware.

At 1905, the method may include transmitting, to a receiving UE, a request to establish a unicast connection with a first transmission reception point of multiple transmission reception points for the receiving UE. The operations of 1905 may be performed according to the methods described herein. In some examples, aspects of the operations of 1905 may be performed by a unicast connection request component 1240 as described with reference to FIG. 12.

At 1910, the method may include receiving, from the receiving UE, a set of transmission parameters to use for subsequent communications on the unicast connection, the set of transmission parameters enabling the receiving UE to receive transmissions from a set of multiple transmitting UEs including the transmitting UE on a same set of time and frequency resources via an SDM scheme. The operations of 1910 may be performed according to the methods described herein. In some examples, aspects of the operations of 1910 may be performed by a transmission parameter reception component 1245 as described with reference to FIG. 12.

At 1915, the method may include receiving, from the receiving UE, the set of transmission parameters via a sidelink control information message. The operations of 1915 may be performed according to the methods described herein. In some examples, aspects of the operations of 1915 may be performed by a transmission parameter reception component 1245 as described with reference to FIG. 12.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a receiving user equipment (UE), comprising:
   establishing a plurality of unicast connections with a plurality of transmitting UEs, the plurality of transmitting UEs comprising one or more first transmitting UEs connected to a first transmission reception point of the receiving UE via respective unicast connections of the plurality of unicast connections and one or more second transmitting UEs connected to a second transmission reception point of the receiving UE via respective unicast connections of the plurality of unicast connections;
   determining a plurality of sets of transmission parameters for the plurality of transmitting UEs, the plurality of sets of transmission parameters enabling the receiving UE to receive transmissions from the plurality of transmitting UEs on a same set of time and frequency resources via a spatial division multiplexing scheme; and
   transmitting each set of transmission parameters from the plurality of sets of transmission parameters to respective transmitting UEs of the plurality of transmitting UEs.

2. The method of claim 1, wherein transmitting each set of transmission parameters to the respective transmitting UEs comprises:
   transmitting each set of transmission parameters via a sidelink control information message to the respective transmitting UEs, wherein each set of transmission parameters is indicated via a resource bit map in the sidelink control information message and the sidelink control information message comprises a second stage sidelink control information message.

3. The method of claim 1, further comprising:
   transmitting, to the respective transmitting UEs, an indication for a control demodulation reference signal cyclic shift for each transmitting UE to use when transmitting communications to the receiving UE, wherein the control demodulation reference signal cyclic shift further enables the receiving UE to receive the transmissions from the plurality of transmitting UEs on the same set of time and frequency resources via the spatial division multiplexing scheme.

4. The method of claim 3, wherein transmitting the indication for the control demodulation reference signal cyclic shift comprises:
   transmitting the indication for the control demodulation reference signal cyclic shift to the respective transmitting UEs via a sidelink control information message.

5. The method of claim 4, wherein the sidelink control information message comprises a second stage sidelink control information message for UE coordination.

6. A method for wireless communications at a transmitting user equipment (UE), comprising:
   transmitting, to a receiving UE, a request to establish a unicast connection with a first transmission reception point of multiple transmission reception points for the receiving UE; and
   receiving, from the receiving UE, a set of transmission parameters to use for subsequent communications on the unicast connection, the set of transmission parameters enabling the receiving UE to receive transmissions from a plurality of transmitting UEs including the transmitting UE on a same set of time and frequency resources via a spatial division multiplexing scheme.

7. The method of claim 6, wherein receiving the set of transmission parameters comprises:
   receiving, from the receiving UE, the set of transmission parameters via a sidelink control information message, wherein the set of transmission parameters is indicated via a resource bit map in the sidelink control information message and the sidelink control information message comprises a second stage sidelink control information message.

8. The method of claim 6, further comprising:
   receiving, from the receiving UE, an indication for a control demodulation reference signal cyclic shift to use for the subsequent communications, wherein the control demodulation reference signal cyclic shift further enables the receiving UE to receive the transmissions from the plurality of transmitting UEs on the same set of time and frequency resources via the spatial division multiplexing scheme.

9. The method of claim 8, wherein receiving the indication for the control demodulation reference signal cyclic shift comprises:
   receiving, from the receiving UE, the indication for the control demodulation reference signal cyclic shift via a sidelink control information message.

10. The method of claim 9, wherein the sidelink control information message comprises a second stage sidelink control information message for UE coordination.

11. An apparatus for wireless communications at a receiving user equipment (UE), comprising:
    a processor;
    memory coupled with the processor; and
    instructions stored in the memory and executable by the processor to cause the apparatus to:
      establish a plurality of unicast connections with a plurality of transmitting UEs, the plurality of transmitting UEs comprising one or more first transmitting UEs connected to a first transmission reception point of the receiving UE via respective unicast connections of the plurality of unicast connections and one or more second transmitting UEs connected to a second transmission reception point of the receiving UE via respective unicast connections of the plurality of unicast connections;
      determine a plurality of sets of transmission parameters for the plurality of transmitting UEs, the plurality of sets of transmission parameters enabling the receiving UE to receive transmissions from the plurality of transmitting UEs on a same set of time and frequency resources via a spatial division multiplexing scheme; and
      transmit each set of transmission parameters from the plurality of sets of transmission parameters to respective transmitting UEs of the plurality of transmitting UEs.

12. The apparatus of claim 11, wherein the instructions to transmit each set of transmission parameters to the respective transmitting UEs are executable by the processor to cause the apparatus to:
    transmit each set of transmission parameters via a sidelink control information message to the respective transmitting UEs, wherein each set of transmission parameters is indicated via a resource bit map in the sidelink control information message and the sidelink control information message comprises a second stage sidelink control information message.

13. The apparatus of claim 11, wherein the instructions are further executable by the processor to cause the apparatus to:
transmit, to the respective transmitting UEs, an indication for a control demodulation reference signal cyclic shift for each transmitting UE to use when transmitting communications to the receiving UE, wherein the control demodulation reference signal cyclic shift further enables the receiving UE to receive the transmissions from the plurality of transmitting UEs on the same set of time and frequency resources via the spatial division multiplexing scheme.

14. The apparatus of claim 13, wherein the instructions to transmit the indication for the control demodulation reference signal cyclic shift are executable by the processor to cause the apparatus to:
transmit the indication for the control demodulation reference signal cyclic shift to the respective transmitting UEs via a sidelink control information message.

15. The apparatus of claim 14, wherein the sidelink control information message comprises a second stage sidelink control information message for UE coordination.

16. The apparatus of claim 11, wherein the instructions are further executable by the processor to cause the apparatus to:
transmit, to the respective transmitting UEs, an indication of a channel measurement resource and an interference measurement resource; and
estimate a channel measurement and an interference measurement per transmission reception point for the transmissions from the plurality of transmitting UEs on the same set of time and frequency resources based at least in part on the indication of the channel measurement resource and the interference measurement resource, wherein the transmissions from the plurality of transmitting UEs are received based at least in part on the estimating.

17. The apparatus of claim 16, wherein the instructions to transmit the indication of the channel measurement resource and the interference measurement resource are executable by the processor to cause the apparatus to:
transmit the indication of the channel measurement resource and the interference measurement resource to each transmitting UE via a sidelink control information message.

18. The apparatus of claim 17, wherein the sidelink control information message comprises a second stage sidelink control information message for UE coordination.

19. The apparatus of claim 16, wherein the instructions are further executable by the processor to cause the apparatus to:
receive a zero power resource from one or more transmitting UEs of the plurality of transmitting UEs for the channel measurement resource, the interference measurement resource, or both, wherein the estimating the interference measurement is based at least in part on a measurement of the zero power resource.

20. The apparatus of claim 11, wherein the instructions are further executable by the processor to cause the apparatus to:
select the plurality of transmitting UEs for establishing the plurality of unicast connections based at least in part on detecting a sidelink control information message from each of the plurality of transmitting UEs, performing a signal quality measurement among the first transmission reception point and the second transmission reception point of the receiving UE for each transmitting UE, or a combination thereof.

21. The apparatus of claim 11, wherein the instructions to determine the plurality of sets of transmission parameters are executable by the processor to cause the apparatus to:
determine the plurality of sets of transmission parameters for the respective transmitting UEs of the plurality of transmitting UEs based at least in part on which transmission reception point of the receiving UE is used for a respective unicast connection with a transmitting UE of the plurality of transmitting UEs.

22. The apparatus of claim 21, wherein a same set of transmission parameters is used for a first transmitting UE and for a second transmitting UE of the plurality of transmitting UEs based at least in part on the a first unicast connection being established between the first transmitting UE and the receiving UE via the first transmission reception point and a second unicast connection being established between the second transmitting UE and the receiving UE via the second transmission reception point.

23. The apparatus of claim 11, wherein the instructions to determine the plurality of sets of transmission parameters are executable by the processor to cause the apparatus to:
determine the plurality of sets of transmission parameters based at least in part on one or more signal quality measurements of the plurality of unicast connections.

24. The apparatus of claim 23, wherein the one or more signal quality measurements comprise a reference signal strength indicator measurement, a reference signal received power measurement, biased information for each of the plurality of transmitting UEs, or a combination thereof.

25. The apparatus of claim 11, wherein each set of transmission parameters comprises a transmission schedule adjustment, a transmit power, a transmit time, an indication of the time and frequency resources, or a combination thereof.

26. An apparatus for wireless communications at a transmitting user equipment (UE), comprising:
a processor;
memory coupled with the processor; and
instructions stored in the memory and executable by the processor to cause the apparatus to:
transmit, to a receiving UE, a request to establish a unicast connection with a first transmission reception point of multiple transmission reception points for the receiving UE; and
receive, from the receiving UE, a set of transmission parameters to use for subsequent communications on the unicast connection, the set of transmission parameters enabling the receiving UE to receive transmissions from a plurality of transmitting UEs including the transmitting UE on a same set of time and frequency resources via a spatial division multiplexing scheme.

27. The apparatus of claim 26, wherein the instructions to receive the set of transmission parameters are executable by the processor to cause the apparatus to:
receive, from the receiving UE, the set of transmission parameters via a sidelink control information message, wherein the set of transmission parameters is indicated via a resource bit map in the sidelink control information message and the sidelink control information message comprises a second stage sidelink control information message.

28. The apparatus of claim 26, wherein the instructions are further executable by the processor to cause the apparatus to:
receive, from the receiving UE, an indication for a control demodulation reference signal cyclic shift to use for the subsequent communications, wherein the control demodulation reference signal cyclic shift further enables the receiving UE to receive the transmissions from the plurality of transmitting UEs on the same set of time and frequency resources via the spatial division multiplexing scheme.

29. The apparatus of claim 28, wherein the instructions to receive the indication for the control demodulation reference signal cyclic shift are executable by the processor to cause the apparatus to:
receive, from the receiving UE, the indication for the control demodulation reference signal cyclic shift via a sidelink control information message.

30. The apparatus of claim 29, wherein the sidelink control information message comprises a second stage sidelink control information message for UE coordination.

31. The apparatus of claim 26, wherein the instructions are further executable by the processor to cause the apparatus to:
receive, from the receiving UE, an indication of a channel measurement resource and an interference measurement resource for the subsequent communications.

32. The apparatus of claim 31, wherein the instructions to receive the indication of the channel measurement resource and the interference measurement resource are executable by the processor to cause the apparatus to:
receive, from the receiving UE, the indication of the channel measurement resource and the interference measurement resource via a sidelink control information message.

33. The apparatus of claim 32, wherein the sidelink control information message comprises a second stage sidelink control information message for UE coordination.

34. The apparatus of claim 31, wherein the instructions are further executable by the processor to cause the apparatus to:
transmit, to the receiving UE, a zero power resource using the channel measurement resource, the interference measurement resource, or both.

35. The apparatus of claim 26, wherein the set of transmission parameters comprises a transmission schedule adjustment, a transmit power, a transmit time, an indication of the time and frequency resources, or a combination thereof.

* * * * *